United States Patent
Park

(10) Patent No.: US 11,880,243 B2
(45) Date of Patent: Jan. 23, 2024

(54) DISPLAY DEVICE AND METHOD OF MANUFACTURING THE SAME

(71) Applicant: Samsung Display Co., Ltd., Yongin-si (KR)

(72) Inventor: Raesun Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/974,421

(22) Filed: Oct. 26, 2022

(65) Prior Publication Data

US 2023/0132649 A1 May 4, 2023

(30) Foreign Application Priority Data

Oct. 28, 2021 (KR) ........................ 10-2021-0146062

(51) Int. Cl.
*G09G 5/00* (2006.01)
*G06F 1/16* (2006.01)
*G02B 1/11* (2015.01)

(52) U.S. Cl.
CPC .............. *G06F 1/1652* (2013.01); *G02B 1/11* (2013.01)

(58) Field of Classification Search
CPC ... G06F 1/1652; G09G 2380/02; G09F 9/301; G02F 1/133305; G02B 1/14; H10K 77/111
See application file for complete search history.

(56) References Cited

U.S. PATENT DOCUMENTS

| | | | |
|---|---|---|---|
| 9,655,235 B2 | 5/2017 | Hwang et al. | |
| 10,153,457 B2 | 12/2018 | Son et al. | |
| 10,186,688 B2 | 1/2019 | Namkung | |
| 10,388,713 B2 | 8/2019 | Son et al. | |
| 10,720,485 B2 | 7/2020 | Aoki | |
| 11,665,955 B2 * | 5/2023 | Park ........................ | H10K 59/12 257/40 |
| 2016/0103539 A1 * | 4/2016 | Jinbo .................... | G06F 3/0446 345/173 |
| 2016/0181346 A1 * | 6/2016 | Kwon ................... | H01L 27/124 257/40 |
| 2017/0323779 A1 * | 11/2017 | Um ...................... | G02F 1/13454 |
| 2017/0352834 A1 * | 12/2017 | Kim ..................... | H10K 50/844 |

(Continued)

FOREIGN PATENT DOCUMENTS

| KR | 10-2017-0020674 A | 2/2017 |
|---|---|---|
| KR | 10-2018-0045983 A | 5/2018 |

(Continued)

OTHER PUBLICATIONS

US 9,615,449 B2, 04/2017, Hwang et al. (withdrawn)

*Primary Examiner* — Joe H Cheng
(74) *Attorney, Agent, or Firm* — Lewis Roca Rothgerber Christie LLP

(57) ABSTRACT

The present disclose provides a display device and a method of manufacturing the same. A display device includes a display panel including a substrate having a bent portion and a bending protective layer arranged on the bent portion of the substrate, and an optical functional layer on the display panel and in contact with the bending protective layer, the optical functional layer having an accommodating portion configured to accommodate deformation of the optical functional layer.

25 Claims, 21 Drawing Sheets

(56) References Cited

U.S. PATENT DOCUMENTS

| | | | | |
|---|---|---|---|---|
| 2018/0090702 A1* | 3/2018 | Um | ...................... | H10K 50/844 |
| 2018/0175323 A1* | 6/2018 | Ahn | ...................... | H10K 77/111 |
| 2019/0259965 A1* | 8/2019 | Jeon | ...................... | H10K 50/86 |
| 2020/0105168 A1* | 4/2020 | Choi | ...................... | G06F 1/1652 |
| 2020/0388784 A1* | 12/2020 | Kim | ...................... | H10K 50/84 |
| 2021/0191459 A1* | 6/2021 | Kim | ...................... | G06F 1/1637 |
| 2021/0378109 A1* | 12/2021 | Kim | ........................ | H05K 5/03 |
| 2022/0310970 A1* | 9/2022 | Choi | ...................... | H10K 50/868 |
| 2023/0136310 A1* | 5/2023 | Park | ...................... | G06F 1/1616 |
| | | | | 361/679.01 |

FOREIGN PATENT DOCUMENTS

| | | |
|---|---|---|
| KR | 10-2018-0082717 A | 7/2018 |
| KR | 10-1958802 B1 | 3/2019 |

* cited by examiner

DISPLAY DEVICE AND METHOD OF MANUFACTURING THE SAME

CROSS-REFERENCE TO RELATED APPLICATION

This application claims priority to and the benefit of Korean Patent Application No. 10-2021-0146062, filed on Oct. 28, 2021, in the Korean Intellectual Property Office (KIPO), the entire disclosure of which is incorporated by reference herein.

BACKGROUND

1. Field

One or more embodiments relate to a device and a method, and more particularly, to a display device and a method of manufacturing a display device.

2. Description of the Related Art

Electronic devices based on mobility are widely used. Tablet personal computers (PCs) have been recently widely used as mobile electronic devices in addition to small electronic devices such as mobile phones.

Such an electronic device based on mobility includes a display device to provide a user with visual information such as an image or video to support various functions. Recently, as other components for driving the display device are miniaturized, the ratio of the display device in electronic devices has been gradually increasing in the electronic device, and the structure that can be bent to have a predetermined angle in a flat state has also been developed.

In such a display device, a substrate of a display panel may be bent. At this time, a bending protective layer can be formed to protect the bent portion of the substrate. In this case, the end of the bending protective layer causes interference of the display panel or some configuration of the display device during bending of the substrate so that the quality of the display device may be lowered.

SUMMARY

Generally, when an end of a bending protective layer is in contact with an end of an optical functional layer, the end of the bending protective layer is pushed by the optical functional layer during the bending of the substrate, which may cause excessive stress concentration on at least one of components of a display device. In this case, a cover member of the display device may be lifted so that the cover member of the display device may be separated from another part.

Aspects of one or more embodiments of the present disclosure are directed to a display device in which a phenomenon that a cover member is lifted during bending of a substrate, is minimized or reduced, and a method of manufacturing the display device.

Additional aspects will be set forth in part in the description which follows and, in part, will be apparent from the description, or may be learned by practice of the presented embodiments of the disclosure.

According to one or more embodiments, a display device includes a display panel including a substrate having a bent portion and a bending protective layer arranged on the bent portion of the substrate, and an optical functional layer on the display panel and in contact with the bending protective layer, the optical functional layer having an accommodating portion configured to accommodate deformation of the optical functional layer.

The display device may further include a cover member arranged on the optical functional layer.

The cover member may include an opaque layer configured to block or reduce transmission of light.

The accommodating portion may be disposed to overlap the opaque layer in a plan view.

The display device may further include a first adhesive member arranged between the cover member and the optical functional layer.

The first adhesive member may shield the accommodating portion.

The first adhesive member may expose the accommodating portion to an outside.

The accommodating portion may be in the optical functional layer and the first adhesive member.

The accommodating portion may be a groove or hole arranged in the optical functional layer.

At least a portion of an inner surface of the accommodating portion may be inclined.

At least a portion of an inner surface of the accommodating portion may be curved.

An inner surface of the accommodating portion may be stepped.

The display device may further include at least one of a protective film, a panel protective member, a plate, a digitizer, or a cushion layer arranged on a surface of the display panel.

The accommodating portion may have a linear shape in a cross-sectional view.

According to one or more embodiments, a method of manufacturing a display device, includes attaching a first upper cover film to a first surface of an optical functional layer, attaching a lower cover film to a second surface of the optical functional layer, removing a part of the first upper cover film, removing a part of the optical functional layer, and attaching a second upper cover film to the first surface of the optical functional layer.

The lower cover film may include a first lower cover film and a second lower cover film. The method may further include removing the second lower cover film of the lower cover film.

The method may further include removing the first lower cover film and attaching the optical functional layer to a display panel.

The method may include forming a bending protective layer in a bending area of the display panel to be in contact with an end of the optical functional layer.

The second lower cover film, the optical functional layer, and the second upper cover film may be stacked together. The method may further include cutting the second lower cover film, the optical functional layer, and the second upper cover film to a certain length.

The method may further include arranging the optical functional layer from which the second lower cover film is removed, on a display panel.

An end of the second upper cover film is farther from an end of the display panel than an end of the optical functional layer is to the end of the display panel.

The part of the first upper cover film and the part of the optical functional layer may be concurrently (e.g., simultaneously) removed.

According to one or more embodiments, a method of manufacturing a display device, includes arranging an optical functional layer on a display panel, removing a part of the optical functional layer, and forming a bending protective layer in a bending area of the display panel to be in contact with an end of the optical functional layer.

The method may further include removing a part of an upper cover film arranged on the optical functional layer.

The method may further include entirely removing the upper cover film on the optical functional layer.

Other aspects, features, and advantages than the above-described aspects, features, and advantages may be apparent from the following drawings, the claims, and the detailed description of the present disclosure.

This general and concrete aspect may be implemented using a system, method, computer program, or a combination of any system, method, and computer program.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
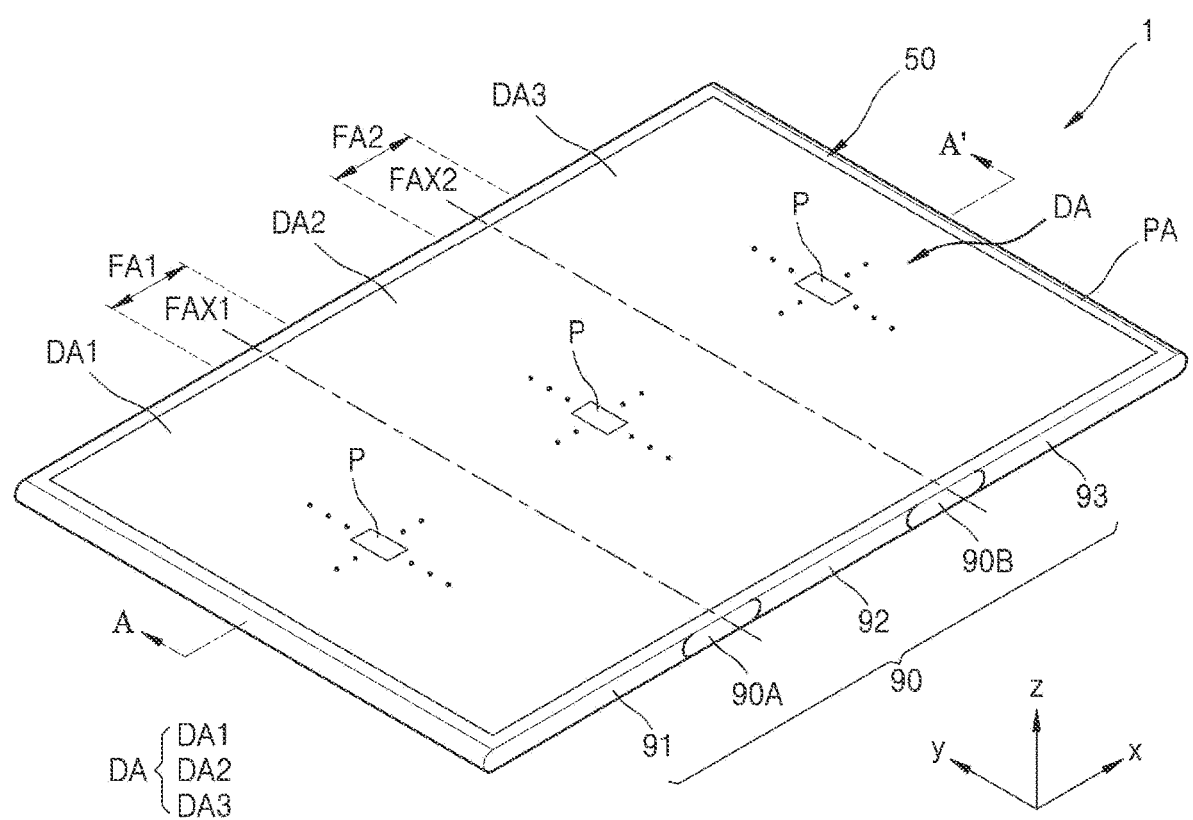
FIGS. 1A and 1B are perspective views schematically illustrating a display device according to one or more embodiments.

Reference will now be made in more detail to embodiments, examples of which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein. Accordingly, the embodiments are merely described below, by referring to the drawings, to explain aspects of the present description.

As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

Because various suitable transformations and various suitable embodiments of the present disclosure are possible, specific embodiments are illustrated in the drawings and described in more detail in the detailed description. The effects and features of the present disclosure, and the method of achieving them will be clearly referred to in more detail with the following embodiments described in more detail with reference to the drawings. However, embodiments are not limited to the embodiments disclosed herein, but may be implemented in a variety of forms.

Although the terms first, second, etc. may be used to describe various elements, these elements should not be limited by these terms. These terms are only used to distinguish one element from another element. For example, a first element may be referred to as a second element, and similarly, a second element may also be referred to as a first element without departing from the scope of the present disclosure.

As used herein, the singular forms "a," "an," and "the" are intended to include the plural forms as well, unless the context clearly indicates otherwise.

It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

It will be understood that when an element is referred to as being "on," "connected to," or "coupled to" another element, it may be directly on, connected, or coupled to the other element or one or more intervening elements may also be present. When an element is referred to as being "directly on," "directly connected to," or "directly coupled to" another element, there are no intervening elements present.

In the drawings, the relative sizes of elements, layers, and regions may be exaggerated and/or simplified for clarity. Spatially relative terms, such as "beneath," "below," "lower," "above," "upper," "bottom," "top," and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

In the drawings, for convenience of description, the sizes of components may be exaggerated or reduced. For example, because the size and thickness of each component shown in the drawings are arbitrarily indicated for convenience of description, the present disclosure is not necessarily limited to the illustration.

In the present specification, "A and/or B" indicates A, B, or A and B. In addition, in the present specification, "at least one of A and B" indicates A, B, or A and B.

Further, the use of "may" when describing embodiments of the present disclosure refers to "one or more embodiments of the present disclosure."

As used herein, the terms "substantially," "about," and similar terms are used as terms of approximation and not as terms of degree, and are intended to account for the inherent deviations in measured or calculated values that would be recognized by those of ordinary skill in the art.

In the following embodiments, a wire "extending in a first direction or a second direction" refers to not only extending in a straight shape, but also extending with a zigzag or curve along the first direction or second direction.

In the following embodiments, a "plan view" refers to when a target portion is viewed above, and a "cross-sectional view" refers to when a cross-section in which the target portion is vertically cut is viewed from a lateral direction. In the following embodiments, when referred to as "overlapping", this includes overlapping in a "plan view" and a "cross-sectional view".

Unless otherwise defined, all terms (including technical and scientific terms) used herein have the same meaning as commonly understood by one of ordinary skill in the art to which this disclosure pertains. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments of the present disclosure will be described in more detail with reference to the accompanying drawings, and when described with reference to the drawings, the same or corresponding components are given the same reference numerals, and repeated description thereof will not be provided.

Figure 1B:
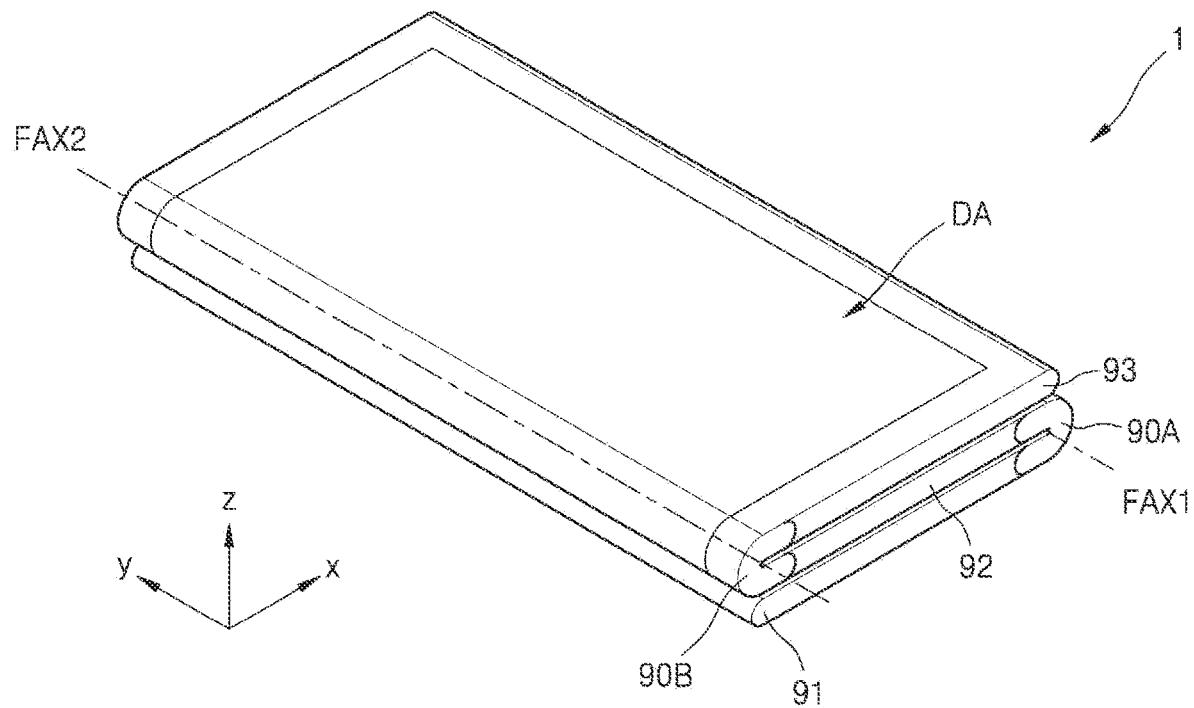

FIGS. 1A and 1B are perspective views schematically illustrating a display device according to one or more embodiments. For example, FIG. 1A is a perspective view illustrating a state in which a display device 1 is in an unfolded state, and FIG. 1B is a perspective view illustrating a state in which the display device 1 is in a folded state.

Referring to FIGS. 1A and 1B, the display device 1 that is a device for displaying a moving image or a still image may be used as a display screen of portable electronic devices, such as mobile phones, smartphones, tablet personal computers (PCs), mobile communication terminals, electronic notebooks, e-books, portable multimedia players (PMPs), navigation devices, ultra mobile PCs (UMPCs), and various suitable products such as televisions, laptops, monitors, billboards, Internet of things (IOT), and/or the like. In one or more embodiments, the display device 1 may be used as a wearable device such as a smart watch, a watch phone, a glass-type display, or a head mounted display (HMD). In one or more embodiments, the display device 1 may be used as a vehicle instrument panel, a center information display (CID) disposed on a center fascia or a dashboard of a vehicle, a room mirror display that replaces a side mirror of the vehicle, or a display that is disposed on a rear surface of a front seat as entertainment for a back seat of the vehicle.

The display device 1 may include a display panel 50 and a lower cover 90. The display panel 50 may include a display area DA in which an image is displayed, and a peripheral area PA around the display area DA. Pixels P including a display element may be arranged in the display area DA. At this time, a plurality of pixels P may be provided, and the plurality of pixels P may be disposed so as to be spaced from each other. Some of the plurality of pixels (e.g., first ones of the plurality of pixels) P, some other pixels (e.g., second ones of the plurality of pixels) P, and some other pixels (e.g., third ones of the plurality of pixels) P may emit light of different colors from each other. The display device 1 may provide an image using light emitted from the pixels P disposed in the display area DA, and the peripheral area PA may be a non-display area in which the pixels P are not disposed.

The display area DA may include a first display area DA1, a second display area DA2, and a third display area DA3. The pixels P may be arranged in each of the first display area DA1, the second display area DA2, and the third display area DA3. The display device 1 may provide an image through the first display area DA1, the second display area DA2, and the third display area DA3. The peripheral area PA may be around (e.g., surrounds) the first display area DA1, the second display area DA2, and the third display area DA3.

The display panel 50 may display (output) information processed by the display device 1. For example, the display panel 50 may display execution screen information of an application driven by the display device 1, user interface (UI) information or graphical user interface (GUI) information according to execution screen information. The display panel 50 may include a display layer for displaying an image and a touch screen layer for sensing a user's touch input. As a result, the display panel 50 may function as one of input devices that provide an input interface between the display device 1 and a user, and concurrently (e.g., simultaneously), may function as one of output units that provide an output interface between the display device 1 and the user.

Hereinafter, an organic light emitting display device is described as an example of the display device 1 according to one or more embodiments, but the display device of the present disclosure is not limited thereto. In one or more embodiments, the display device 1 of the present disclosure may be a display device such as an inorganic light emitting display or an inorganic electroluminescent (EL) display, or a quantum dot light emitting display. For example, a light emitting layer of a display element provided in the display device 1 may include an organic material, an inorganic material, quantum dots, an organic material and quantum dots, or an inorganic material and quantum dots.

In one or more embodiments, the display panel 50 may be a flexible display panel that has flexibility and may be easily bent, folded or rolled. For example, the display panel 50 may be a foldable display panel, a curved display panel having a bent display surface, a bendable display panel in which areas other than a display surface are bent, a rollable display panel, or a stretchable display panel. In one or more embodiments, the display panel 50 may be a rigid display panel that is rigid and not easily bent.

In one or more embodiments, the display panel 50 may include a first folding axis FAX1 and a second folding axis FAX2. The display panel 50 may be folded based on the first folding axis FAX1 and the second folding axis FAX2.

A first display area DA1 and a second display area DA2 may be defined with the first folding axis FAX1 therebetween. In one or more embodiments, the second display area DA2 and a third display area DA3 may be defined with the second folding axis FAX2 therebetween.

A lower cover 90 may constitute an appearance of a lower surface of the display device 1. The lower cover 90 may include plastic, metal, or plastic and metal. The lower cover 90 may include a first portion 91, a second portion 92, and a third portion 93, which support the display panel 50. The lower cover 90 may be folded around the first folding axis FAX1 between the first portion 91 and the second portion 92. In one or more embodiments, the lower cover 90 may be folded around the second folding axis FAX2 between the second portion 92 and the third portion 93.

In one or more embodiments, a first hinge portion 90A may be provided between the first portion 91 and the second portion 92, and a second hinge portion 90B may be provided between the second portion 92 and the third portion 93.

In one or more embodiments, the first display area DA1 and the second display area DA2 may be folded to face each other (e.g., in-folded) based on the first folding axis FAX1. For example, the first portion 91 and the second portion 92 may be folded not to face each other (e.g., in-folded) based on the first folding axis FAX1. In one or more embodiments, the first display area DA1 and the second display area DA2 may be folded not to face each other (e.g., out-folded) based on the first folding axis FAX1.

In one or more embodiments, the second display area DA2 and the third display area DA3 may be folded not to face each other (e.g., out-folded) based on the second folding axis FAX2. For example, the second portion 92 and the third portion 93 may be folded to face each other based on the second folding axis FAX2. In one or more embodiments, the second display area DA2 and the third display area DA3 may be folded to face each other (e.g., in-folded) based on the second folding axis FAX2.

In one or more embodiments, in the case of in-folding, whereby the first display area DA1 and the second display area DA2 are folded to face each other, the curvature of a folding portion may be less than 5R. In one or more embodiments, in the case of in-folding, whereby the first display area DA1 and the second display area DA2 are folded to face each other, the curvature of the folding portion may be less than 3R or less than 1R.

In one or more embodiments, in the case of out-folding, whereby the second display area DA2 and the third display area DA3 are folded not to face each other, the curvature of the folding portion may be less than 5R. In one or more embodiments, in the case of out-folding, whereby the second display area DA2 and the third display area DA3 are folded not to face each other, the curvature of the folding portion may be less than 4R.

Figure 1C:
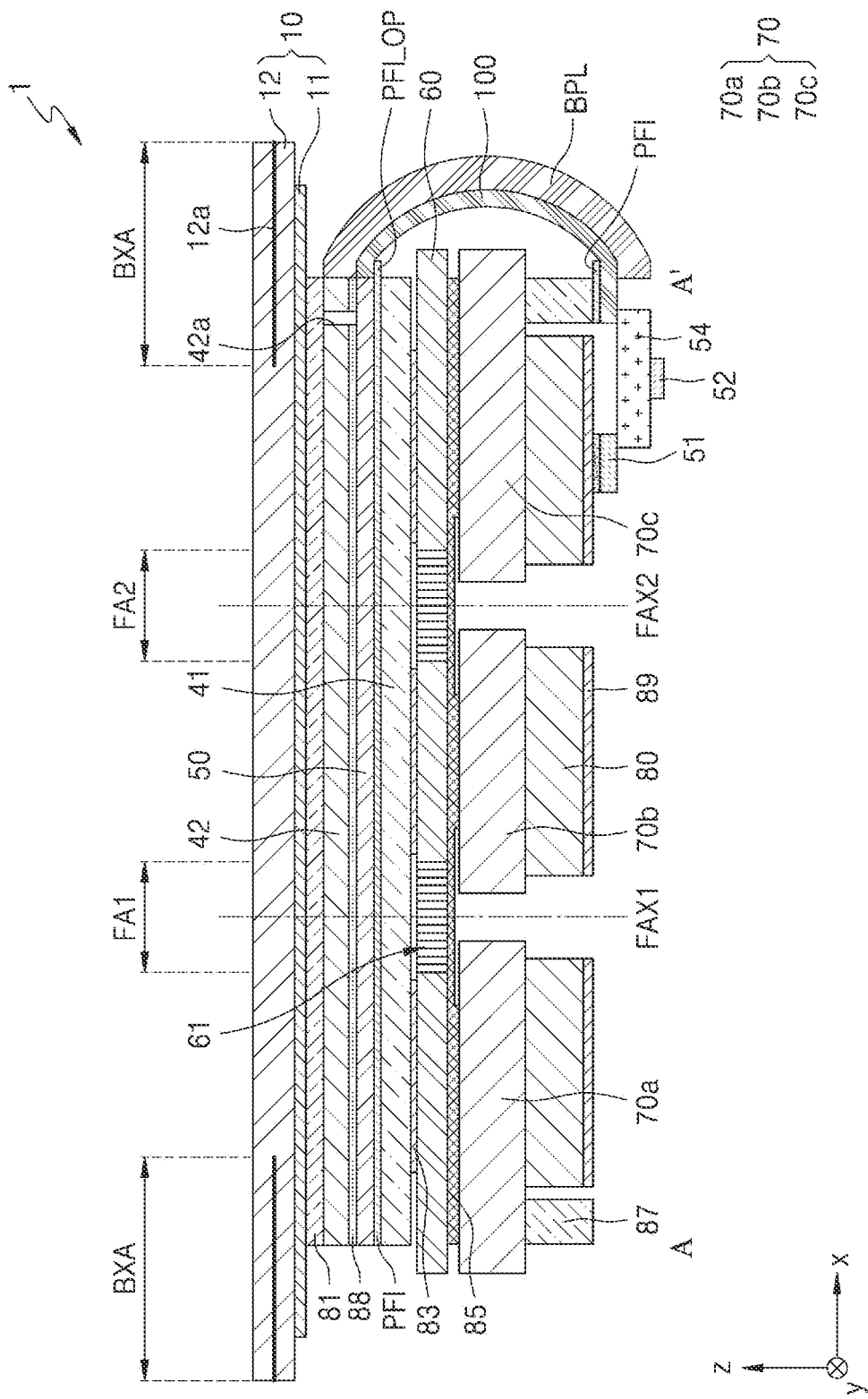
FIG. 1C is a cross-sectional view of the display device taken along the line A-A' of FIG. 1A.

FIG. 1C is a cross-sectional view of the display device taken along the line A-A' of FIG. 1A.

Referring to FIG. 1C, a cover member 10 may be disposed above the display panel 50. In one or more embodiments, the cover member 10 may cover an upper portion of the display panel 50. Thus, the cover member 10 may protect an upper surface of the display panel 50.

In one or more embodiments, the cover member 10 may include a transmission cover portion corresponding to the display panel 50 and a light shielding cover portion corresponding to another region other than the display panel 50. The light shielding cover portion may include an opaque material that shields or blocks light. The light shielding cover portion may include a pattern that may be shown to a user when an image is not displayed.

In one or more embodiments, the cover member 10 may include a cover window 11 and a protective member (e.g., a protective layer) 12. In one or more embodiments, the cover window 11 may be formed of a transparent material. At this time, the cover window 11 may include glass, a synthetic resin of a transparent material, and/or the like. The cover window 11 may include at least one layer.

In one or more embodiments, the protective member 12 may be disposed on the upper surface of the cover window 11 so as to prevent, minimize, or reduce scratches in the cover window 11. In one or more embodiments, an opaque layer 12a may be disposed in a portion of the protective member 12. In one or more embodiments, the opaque layer 12a may be disposed at edges of the protective member 12. The opaque layer 12a may block or reduce transmission of light. For example, the opaque layer 12a may be disposed at outer edges of the protective member 12.

The display panel 50 may be disposed below the cover member 10. The display panel 50 may be connected to a display circuit board 51 through a first ductile film 54. A touch sensor driving portion may be disposed on the display circuit board 51, and a display driving unit (e.g., a display driving portion or a display driving circuit) 52 may also be disposed on the first ductile film 54. In one or more embodiments, the display driving unit 52 may also be directly disposed on a substrate 100 of the display panel 50. In this case, the display panel 50 and the display circuit board 51 may be connected to each other using the first ductile film 54, or the display panel 50 and the display circuit board 51 may be directly connected to each other. At least a portion of the substrate 100 of the display panel 50 described above may be bent. In this case, a bending protective layer BPL may be disposed on a portion in which the substrate 100 is bent, so as to prevent or reduce cracking of the substrate 100. The bending protective layer BPL may include, for example, a polymer resin such as polyethylene terephthalate (PET), polyimide (PI), and/or the like.

The bending protective layer BPL may be disposed to shield a bending region of the display panel 50. In this case, one of the ends of the bending protective layer BPL may be in contact with an end of the optical functional layer 42 in a cross-sectional view.

In one or more embodiments, the optical functional layer 42 may be disposed on the upper portion of the display panel 50 (e.g., the optical functional layer 42 may be disposed on the upper portion of the display panel 50 with a fifth adhesive member 88 therebetween), and a panel protective member 41 may be disposed on the lower portion of the display panel 50 (e.g., a panel protective member 41 may be disposed on the lower portion of the display panel 50 with a protective film PFI therebetween). In this case, the optical functional layer 42 may be disposed between the cover window 11 and the display panel 50. Also, a touch screen layer to which a touch signal is input by the user, may be disposed on the upper portion of the display panel 50.

In one or more embodiments, the optical functional layer 42 may be disposed on the touch screen layer. The optical functional layer 42 may include an antireflection layer. The antireflection layer may reduce the reflectance of light (e.g., external light) incident on or through the display device 1 from the outside.

In one or more embodiments, the antireflection layer may be provided as a polarizing film. The polarizing film may include a phase delay film such as a line polarization plate and a quarter-wave plate ($\lambda/4$ plate). The phase delay film may be disposed on the touch screen layer, and the line polarization plate may be disposed on the phase delay film.

In one or more embodiments, the antireflection layer may include a filter layer including a black matrix and color filters. The color filters may be arranged considering colors of light emitted from sub-pixels of the display device 1. For example, the filter layer may include a red color filter, a green color filter and/or a blue color filter.

In one or more embodiments, the antireflection layer may include a destructive interference structure. The destructive interference structure may include a first reflective layer and a second reflective layer, which are arranged on or at different layers from each other. First reflected light and second reflected light, which are reflected from the first reflective layer and the second reflective layer, respectively, may destructively interfere with each other, and external light reflectance may be reduced accordingly.

The optical functional layer 42 as described above may determine the position of an end of the bending protective layer BPL. For example, when the bending protective layer BPL is formed, the bending protective layer BPL may be formed in the form of a resin and may be supplied to the substrate 100 of the display panel 50. At this time, because the bending protective layer BPL is movable, the bending protective layer BPL may not be in a constant position of the display panel 50 and may be moved in various directions on the display panel 50. However, when the optical functional layer 42 is disposed on the display panel 50, an end of the optical functional layer 42 may be configured to prevent or substantially prevent the bending protective layer BPL from being introduced into the display panel 50 at a position in which the optical functional layer 42 is disposed, and to limit a region in which the bending protective layer BPL moves. Therefore, the bending protective layer BPL may be disposed only to the peripheral area PA of the display panel 50 and may not be placed in the display area DA. In one or more embodiments, an end of the bending protective layer BPL is fixed, attached, or connected to an end of the optical functional layer 42.

A fifth adhesive member 88 may be disposed between the optical functional layer 42 and the display panel 50. The fifth adhesive member 88 may attach the optical functional layer 42 to the display panel 50. At this time, the fifth adhesive member 88 may be a transparent adhesive member such as a pressure sensitive adhesive (PSA) or an optical transparent adhesive (OCA) film.

An accommodating portion BH may be disposed on (e.g., may be in or through) the optical functional layer 42. At this time, the accommodating portion BH may have a form in which a portion of the optical functional layer 42 is removed. For example, the accommodating portion BH may be in the form of a hole or a groove disposed in or defined by the optical functional layer 42. In this case, the accommodating portion BH may be in a state in which at least a portion of the optical functional layer 42 is removed in the thickness direction of the optical functional layer 42.

The accommodating portion BH may be arranged to overlap an opaque area BXA in which the opaque layer 12a is disposed. For example, the width (e.g., measured in an x direction of FIG. 1C) of the accommodating portion BH may be less than that of the opaque area BXA. Also, the accommodating portion BH may be disposed in the peripheral area PA. Thus, the accommodating portion BH may not be seen from the outside of the display device 1 and may not damage or interfere with an image implemented by the display panel 50 when the display panel 50 is operated.

The accommodating portion BH as described above may prevent or substantially prevent the optical functional layer 42 from applying a force to the bending protective layer BPL when the display panel 50 is bent, or may prevent or substantially prevent the optical functional layer 42 from applying a force to the bending protective layer BPL when the display panel 50 is folded. For example, when the accommodating portion BH is not present and the display panel 50 is bent, the display panel 50 and the bending protective layer BPL may be bent in a state in which an end of the bending protective layer BPL is in contact with the optical functional layer 42, so that the end of the bending protective layer BPL may be more convex than other portions by applying a force to the optical functional layer 42. In this case, the edge region of the cover member 10 may be increased. In this case, a force in which the cover member 10 and the optical functional layer 42 are separated from each other, or a force in which the optical functional layer 42 is separated from the display panel 50, may be generated. Therefore, when the display device 1 is folded, the end of the optical functional layer 42 may be configured to apply a force to the optical functional layer 42 so that the problem described above may occur.

However, when the accommodating portion BH is disposed as described above, deformation of the end of the optical functional layer 42 may be accommodated by the accommodating portion BH. For example, when the end of the optical function layer 42 is deformed as described above, the shape of the accommodating portion BH is changed so that the position of the end of the optical functional layer 42 is freely movable and a part of a force that the end of the optical functional layer 42 applies to the bending protective layer BPL or a part of a force that the end of the bending protective layer BPL applies to the optical functional layer 42, may be absorbed.

In one or more embodiments, when a space, in which the end of the bending protective layer BPL is separated from the end of the optical functional layer 42, is formed and static electricity, foreign materials, and/or the like are introduced into the space, the display panel 50 may malfunction. However, the end of the bending protective layer BPL may be in full contact with the optical functional layer 42 so that the above problem may be prevented or substantially prevented from occurring.

Therefore, the accommodating portion BH as described above may be somewhat free of deformation of the end of the bending protective layer BPL. The end of the bending protective layer BPL is in full contact with the optical functional layer 42 so that a space between the end of the bending protective layer BPL and the optical functional layer 42 may be prevented or substantially prevented from being formed.

The cover member 10 may be disposed on the optical functional layer 42. The cover member 10 may be attached to the optical functional layer 42 by the first adhesive member 81. In one or more embodiments, the first adhesive member 81 may be a transparent adhesive member such as a PSA or an OCA film. In one or more embodiments, the first adhesive member 81 may shield the accommodating portion BH.

In one or more embodiments, a protective film PFI may be disposed under the display panel 50. At this time, the protective film PFI may absorb impact applied from the outside. In this case, an opening region PFI_OP may be disposed in the protective film PFI so as to correspond to a bending area to be described later in the display panel 50. At this time, the width of the opening region PFI_OP may be less than the width of the bending area.

The panel protective member 41 may be disposed under the protective film PFI. The panel protective member 41 may be attached to the lower portion of the protective film PFI through a PSA. However, the present disclosure is not limited thereto.

In one or more embodiments, a digitizer 70 may be disposed in the lower portion of the display panel 50. At this time, the digitizer 70 may include a pattern layer to detect a signal input from an external electronic pen (e.g., an active pen) and/or the like. In particular, the digitizer 70 may detect the intensity, the orientation of the signal input to the electronic pen, and/or the like. The digitizer 70 may be connected (e.g., electrically connected) to a main circuit board separately provided. However, the present disclosure is not limited thereto.

The digitizer 70 according to one or more embodiments may include a first portion 70a, a second portion 70b, and a third portion 70c. In one or more embodiments, at least a portion of the first portion 70a of the digitizer 70 may overlap the first display area DA1, and at least a portion of the second portion 70b of the digitizer 70 may overlap the second display area DA2. At least a portion of the third portion 70c of the digitizer 70 may overlap the third display area DA3. Also, at least a portion of the first portion 70a and the second portion 70b of the digitizer 70 may overlap the first folding area FA1, and at least a portion of the second portion 70b and the third portion 70c of the digitizer 70 may overlap the second folding area FA2.

In one or more embodiments, the first portion 70a and the second portion 70b of the digitizer 70 may be spaced from each other with the first folding axis FAX1 therebetween in a first direction (e.g., x-direction). Also, the second portion 70b and the third portion 70c of the digitizer 70 may be spaced from each other with the second folding axis FAX2 therebetween in the first direction (e.g., x-direction). For example, the digitizer 70 may be provided as a separate type (e.g., separate structures) rather than an integral type (e.g., a monolithic structure). Because the digitizer 70 may be provided as separate structures, cracks may be prevented or substantially prevented from occurring in the digitizer 70 arranged in the first folding area FA1 and the second folding area FA2.

As described above, at least a portion of the digitizer 70 provided in a separate type may be provided to overlap the first folding area FA1 and the second folding area FA2 so that signals may be input even in the first folding area FA1 and the second folding area FA2 and the convenience of the user may be improved.

In one or more embodiments, a plate 60 may be disposed between the display panel 50 and the digitizer 70. In one or more embodiments, the plate 60 may be placed below the display panel 50 to support the display panel 50.

The plate 60 may have various suitable structures depending on the folding form (e.g., foldable regions) of the display device 1. For example, when the display device 1 is not folded, the plate 60 may be in a form whose shape is not changed (e.g., a rigid form).

In one or more embodiments, the plate 60 may include a folding structure 61. The folding structure 61 may vary in shape or length when the display device 1 is folded. In one or more embodiments, the folding structure 61 may include a pattern portion in which an opening is formed, including a concave-convex type, or links rotatably connected to each other. However, the present disclosure is not limited thereto.

In one or more embodiments, the folding structure 61 of the display device 1 may be folded based on (e.g., with respect to) or about the first folding axis FAX1 and the second folding axis FAX2. In one or more embodiments, the folding structure 61 may be provided in such a way that both sides of the folding structure 61 may be symmetrical with each other based on (e.g., with respect to) the first folding axis FAX1 and the second folding axis FAX2. In one or more embodiments, the plate 60 excluding the folding structure 61 may be in a form having a flat upper surface.

In one or more embodiments, the plate 60 may be provided with at least one of glass, plastic, and metal. In one or more embodiments, the plate 60 may include glass and plastic, glass and metal, plastic and metal, or all of glass, plastic, and metal.

In one or more embodiments, the folding structure 61 of the plate 60 may include a metal material, and the remaining portion other than the folding structure 61 in the plate 60 may include a nonmetallic material. However, the present disclosure is not limited thereto.

Referring back to FIG. 1C, in one or more embodiments, the plate 60 may be attached to the panel protective member 41 via the second adhesive member 83. In one or more embodiments, the second adhesive member 83 may be a transparent adhesive member such as a PSA or an OCA film.

In one or more embodiments, the plate 60 and the digitizer 70 may be adhered to each other by a third adhesive member 85. In one or more embodiments, the third adhesive member 85 may be a PSA, an OCA film, or thermoplastic polyurethane (TPU).

In one or more embodiments, the third adhesive member 85 may be located below the plate 60 and may prevent or substantially prevent or minimize or reduce foreign materials from being introduced into the folding structure 61 of the plate 60.

In one or more embodiments, a cushion layer 80 may be disposed under the digitizer 70. In one or more embodiments, the cushion layer 80 may prevent, reduce, or minimize damage by external impact to the digitizer 70 disposed on the cushion layer 80.

In one or more embodiments, an insulating film 89 may be disposed on a lower portion of the display panel 50. Because the cushion layer 80 includes a sticky material, the cushion layer 80 may be attached to another member to prevent or substantially prevent the display device 1 from being folded. Thus, the insulating film 89 may be attached to the lower portion of the cushion layer 80 so that the cushion layer 80 may be prevented from being attached to another member or attaching may be minimized or reduced and thus the display device 1 may be more easily folded.

In one or more embodiments, a fourth adhesive member 87 may be disposed under the digitizer 70. In one or more embodiments, the fourth adhesive member 87 may be a PSA or an OCA film. However, the present disclosure is not limited thereto. In one or more embodiments, the digitizer 70 may be connected to the separately-provided main circuit board by the fourth adhesive member 87. However, the present disclosure is not limited thereto.

The main circuit board as described above may be provided separately from the display circuit board 51 or integrally. At this time, when the main circuit board and the display circuit board 51 are separately provided to be distinguished from each other, the main circuit board and the display circuit board 51 may be connected to each other with a cable. However, hereinafter, for convenience of explanation, the main circuit board will be described in more detail with reference to the case where the main circuit board is provided separately from the display circuit board 51.

The main circuit board may include a main processor, a camera device, a main connector, and components. The main processor may be formed of an integrated circuit. The camera device may be disposed on both the upper surface and the lower surface of the main circuit board, and each of the main processor and the main connector may be disposed on any one of the upper surface and the lower surface of the main circuit board.

The main processor may control all the functions of the display device 1. For example, the main processor may output digital video data to the display driving unit 52 through the display circuit board 51 so as to display an image on the display panel 50. In one or more embodiments, the main processor may receive detection data from the touch sensor driving unit 53. The main processor may determine the user's touch according to sensing data and may perform an operation corresponding to the user's direct touch or proximity touch. For example, the main processor may analyze the sensing data to calculate the user's touch coordinates and then may perform an application or operation indicated by an icon that the user touches. The main processor may be an application processor, a central processing unit, or a system chip including an integrated circuit.

The camera device may process an image frame such as a still image or moving image obtained by an image sensor in a camera mode to output the image frame to the main processor. The camera device may include at least one of a camera sensor (e.g., charge coupled device (CCD), complementary metal-oxide semiconductor (CMOS), etc.), a photo sensor (or an image sensor), and a laser sensor. The camera device may be connected to the image sensor of the component disposed to overlap a component area and may process the image input to the image sensor.

The main connector may be connected to a cable that has passed a cable hole of a bracket, which allows the main circuit board to be connected (e.g., electrically connected) to the display circuit board 51.

In addition to the main processor, the camera device, and the main connector, the main circuit board may further include at least one of a wireless communication unit, f an input unit, a sensor unit, an output unit, an interface unit, memory, and a power supply unit.

The wireless communication unit may include at least one of a broadcast receiving module, a mobile communication module, a wireless Internet module, a short-range communication module, and a location information module.

The broadcast receiving module may receive broadcasting signals and/or broadcasting-related information from an external broadcast management server through a broadcast channel. The broadcast channel may include a satellite channel and a terrestrial channel.

The mobile communication module may transmit/receive a radio signal to/from at least one of a base station, an external terminal, and a server on a mobile communication network configured according to the technical standards or communication methods for mobile communication (e.g., Global System for Mobile Communication (GSM), Code Division Multi Access (CDMA), CDMA2000, Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and/or the like. The radio signal may include a variety of data according to a voice call signal, an image call signal, or character/multimedia message transmission/reception.

The wireless Internet module may refer to a module for wireless internet access. The wireless Internet module may be configured to transmit/receive a radio signal in a communication network according to wireless Internet technologies. Wireless Internet technologies may include, for example, Wireless LAN (WLAN), Wireless Fidelity (Wi-Fi), Wi-Fi Direct, and Digital Living Network Alliance (DLNA), and/or the like.

The short-range communication module is for short range communications and may support short range communications by using at least one of Bluetooth™, Radio Frequency Identification (RFID), Infrared Data Association (IRDA), Ultra Wideband (UWB), ZigBee, Near Field Communication (NFC), Wi-Fi, Wi-Fi Direct, and Wireless Universal Serial Bus (USB) technologies. The short-range communication module may support wireless communications between the display device 1 and the wireless communication system, between the display device 1 and another electronic device, or between networks in which the display device 1 and another electronic device (or an external server) are located, through wireless area networks. The short-range wireless communication network may be a short-range wireless personal area network. Other electronic devices may be wearable devices that may interchange data (or may be interlocked) with the display device 1.

The location information module is a module for acquiring the position (or a current position) of the display device 1, and typical examples of the location information module may include a Global Positioning System (GPS) module, a Wi-Fi module, and/or the like. For example, when the display device 1 utilizes the GPS module, the position of the display device 1 may be obtained using a signal from a GPS satellite. Furthermore, when the display device 1 utilizes a Wi-Fi module, the position of the display device 1 may be obtained based on the information of a wireless access point (AP) that transmits or receives a radio signal to or from the Wi-Fi module. The location information module is a module for obtaining the position (e.g., the current position) of the display device 1 and is not limited to a module for directly calculating or acquiring the position of the display device 1.

The input unit may include an image input unit such as the camera device for inputting an image signal, an acoustic input unit such as a microphone for inputting an acoustic signal, or an input device for receiving information from the user.

The camera device may process an image frame such as a still image or moving picture obtained by an image sensor in an image call mode or a photographing mode. The processed image frame may be displayed on the display panel 50 or stored in memory.

The microphone may process an external acoustic signal as electrically audio data. The processed audio data may be used in various suitable ways depending on the function (or an application being executed) performed by the display device 1. On the other hand, a variety of noise removal algorithms may be implemented for removing noise generated by the process of receiving an external acoustic signal in the microphone.

The main processor may control the operation of the display device 1 so as to correspond to the information input to the input device. The input device may include a mechanical input unit such as a button (e.g., a button located on the rear side or side surface of the display device 1), a dome switch, a jog wheel, a jog switch, and/or the like, or a touch input unit. The touch input unit may include a touch screen layer of the display panel 50.

The sensor unit may include at least one sensor that senses at least one of information in the display device 1, surrounding environment information surrounding the display device 1 and user information and generates a sensing signal corresponding to the sensing. The main processor may control the driving or operation of the display device 1 based on the sensing signal, or may perform data processing, functions, or operations associated with an application installed in the display device 1. The sensor unit may include at least one of a proximity sensor, an illumination sensor, an acceleration sensor, a magnetic sensor, a gravity sensor (G-Sensor), a gyroscope sensor, a motion sensor, an RGB sensor, an infrared (IR) sensor, a finger scan sensor, an ultrasonic sensor, an optical sensor, a battery gauge, an environmental sensor (e.g., a barometer, a hygrometer, a thermometer, a radioactive sensor, a heat sensor, a gas sensor, etc.), or a chemical sensor (e.g., an electronic nose, a healthcare sensor, a biometric sensor, etc.).

The proximity sensor may refer to a sensor that detects whether an object approaching a certain detection surface or an object in the vicinity of the certain detection surface is present, without mechanical contact by using electromagnetic and/or infrared rays. Examples of the proximity sensor may include a transmissive photoelectric sensor, a direct reflective photoelectric sensor, a mirror reflective photoelectric sensor, a high frequency oscillation type proximity sensor, a capacitive proximity sensor, a magnetic proximity sensor, an infrared proximity sensor, and/or the like. The proximity sensor may detect a proximity touch pattern such as proximity touch, a proximity touch distance, a proximity touch direction, a proximity touch speed, a proximity touch time, a proximity touch position, or a proximity touch movement state. The main processor may process data (or information) corresponding to the proximity touch operation and the proximity touch pattern detected by the proximity sensor and may control visual information corresponding to the processed data to be displayed on the display panel 50.

The ultrasonic sensor may recognize the position information of an object using ultrasonic waves. The main processor may calculate the position of the object through the information sensed by an optical sensor and/or a plurality of ultrasonic sensors. Because the speed of light and the speed of ultrasonic waves vary according to the position of the object, the position of the object may be calculated using the time at which light reaches the optical sensor and/or the time at which ultrasonic waves reach the ultrasonic sensor.

The output unit for outputting an output associated with a visual sense, an auditory sense, or a tactile sense may include at least one of the display panel 50, an acoustic output unit, a haptic module, and an optical output unit.

The acoustic output unit may output acoustic data that is received from the wireless communication unit or stored in the memory in a call signal reception mode, a call mode, a recording mode, a voice recognition mode, or a broadcast reception mode. The acoustic output unit may also output an acoustic signal associated with functions (e.g., a call signal receiving sound, a message reception sound, etc.) performed by the display device 1. The acoustic output unit may include a receiver and a speaker. At least one of the receiver and the speaker may be an acoustic generating device that is attached to the display panel 50 (e.g., the lower portion of the display panel 50) and vibrates the display panel 50 to output an acoustic sound. The acoustic generating device may be a piezoelectric element or a piezoelectric actuator that contracts or expands according to an electrical signal, or an exciter that generates a magnetic force using a voice coil and vibrates the display panel 50.

The haptic module may generate a variety of tactile effects that the user may feel. The haptic module may provide vibration to the user as a tactile effect. The intensity and patterns of vibrations generated by the haptic module may be controlled or selected by the user's selection or the setting of the main processor. For example, the haptic module may synthesize and output different vibrations or sequentially output different vibrations. The haptic module may generate various suitable tactile effects such as the effect of pin arrangement for vertical movement for the skin surface in addition to vibration, an injection force or an absorption force of air through an injection port or an inhalation port, the rubbing against the skin surface, the contact of the electrode, or the stimulation of the electrostatic force, or the effect of reproducing cold and warm sense using a heat-absorption or heated device. The haptic module not only may deliver tactile effects through direct contact, but also may allow the user to feel tactile effects through a sense of the fingers or arms.

An optical output unit may output a signal for informing event generation using light of a light source. Examples of events generated by the display device 1 may be message reception, call signal reception, unanswered call, alarm, schedule notification, email reception, and information reception through an application. Signals output by the optical output unit may be implemented as the display device 1 emits monochromic light or colors of light toward the front or rear surface of the display device 1. Signal output may be terminated when the display device 1 detects the user's event confirmation.

An interface unit may serve as a pathway with various suitable types of external devices connected to the display device 1. The interface unit may include at least one of a wired/wireless headset port, an external charger port, a wired/wireless data port, a memory card port, a portion for connecting a device provided with an identification module, an audio input/output (I/O) port, a video I/O port, and an earphone port. The display device 1 may perform appropriate or suitable control related to an external device connected to the interface unit in response to the external device connected to the interface unit.

The memory may store data that supports various suitable functions of the display device 1. The memory may store data and instructions for a plurality of applications (application program) driven by the display device 1 and data and instructions for operations of the display device 1. At least a portion of the plurality of applications may be downloaded from an external server through wireless communication. The memory may store applications for the operation of the main processor, and may temporarily store data such as input/output data, for example, a phone book, a message, a still image, a video, and/or the like. In one or more embodiments, the memory may store haptic data for vibration of various suitable patterns provided to the haptic module and acoustic data for the various suitable acoustics provided to the acoustic output unit. The memory may include a storage medium of at least one type, such as a flash memory type, a hard disk type, a solid state disk (SSD) type, a silicon disk drive type, a multimedia card micro type, memory of a card type (e.g., SD or XD memory, etc.), random access memory (RAM), static random access memory (SRAM), read-only Memory (ROM), electrically erasable programmable read-only memory (EEPROM), programmable read-only memory (PROM), a magnetic memory, a magnetic disk, and an optical disk.

The power supply unit may supply power to each of components included in the display device 1 by receiving external power and internal power under the control of the main processor. The power supply unit may include the battery. Furthermore, the power supply unit may include a connection port, and the connection port may be configured as an example of an interface unit to which an external charger for supplying power for charging of the battery is electrically connected. In one or more embodiments, the power supply unit may be configured to charge the battery in a wireless manner without using the connection port. The battery may receive power from an external wireless power transmission device using one or more of a magnetic resonance coupling method based on a self-inducing phenomenon and a magnetic resonance coupling method based on an electromagnetic resonance phenomenon. The battery may be disposed so as not to overlap the main circuit board in a third direction (e.g., a z-direction). The battery may overlap a battery hole of a bracket.

The lower cover 90 may be disposed below the main circuit board and the battery. The lower cover 90 may be fastened and fixed with the bracket. The lower cover 90 may constitute an appearance of a lower surface of the display device 1. The lower cover 90 may include plastic, metal, or plastic and metal.

Thus, the display device 1 may prevent or substantially prevent the end of the cover member 10 from being lifted. Furthermore, because the display device 1 has no space between the optical functional layer 42 and the bending protective layer BPL, foreign materials and static electricity that may be introduced through this space may be blocked. The position of the bending protective layer BPL is accurately located so that the display device 1 may prevent or substantially prevent the substrate 100 from being damaged during bending of the substrate 100 of the display panel 50.

Figure 2A:
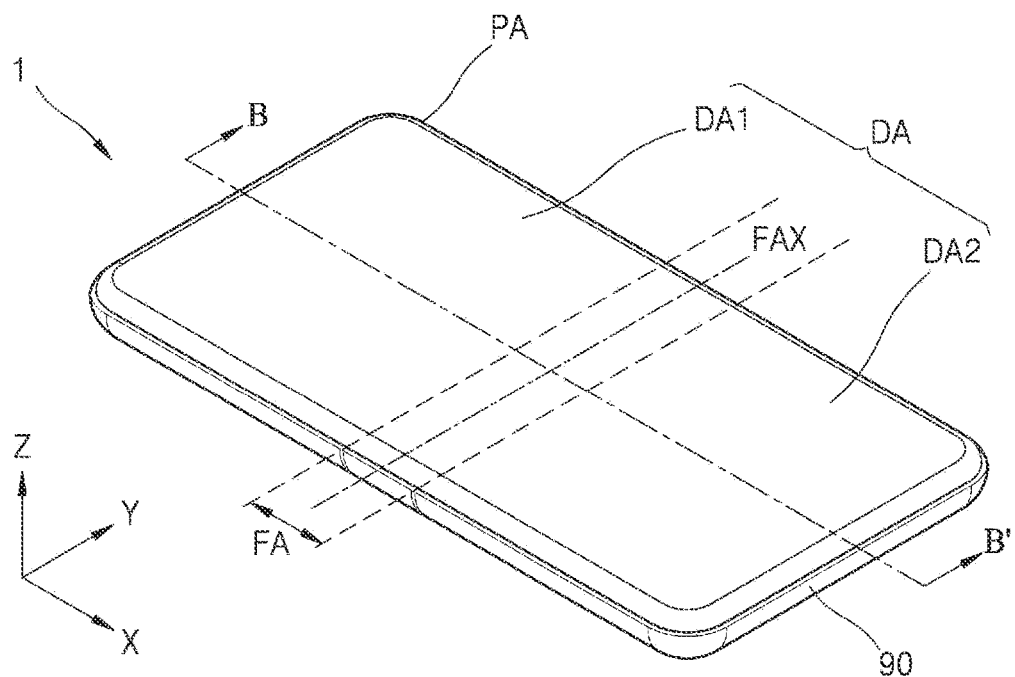
FIG. 2A is a perspective view schematically illustrating a display device according to one or more embodiments.
Figure 2B:
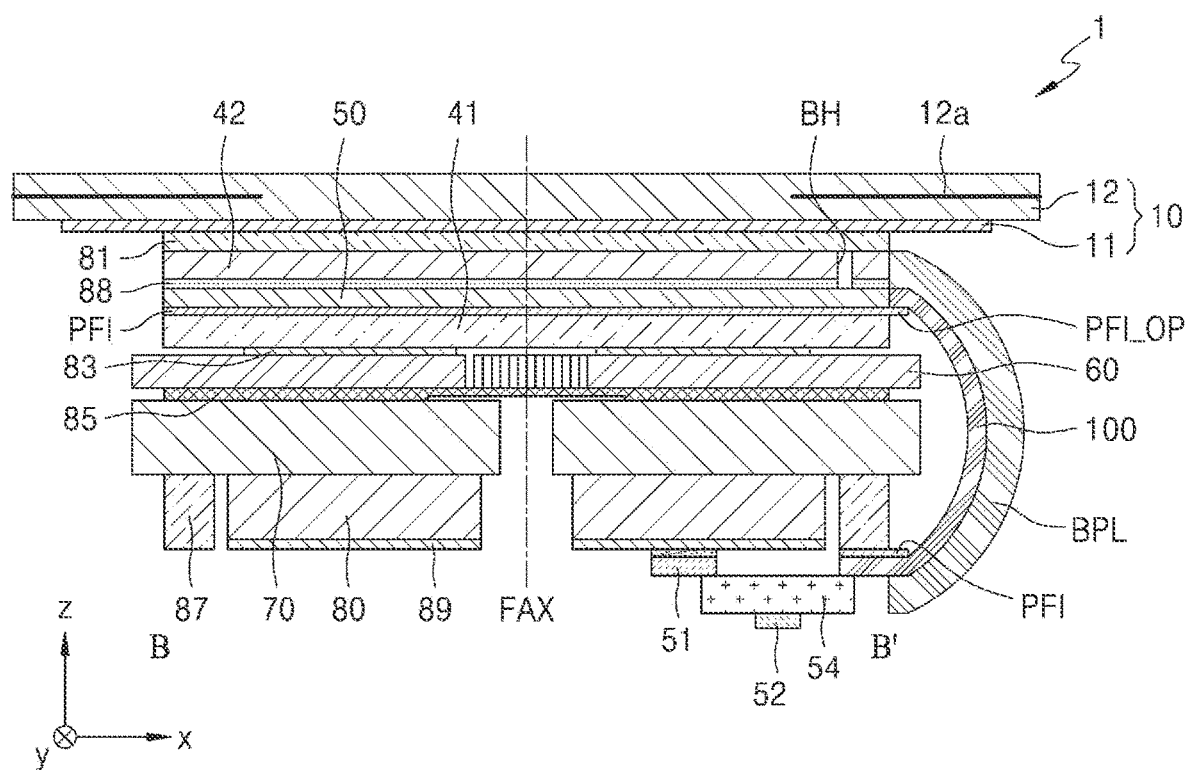
FIG. 2B is a cross-sectional view of the display device taken along the line B-B' of FIG. 2A.

FIG. 2A is a perspective view schematically illustrating a display device according to one or more embodiments. FIG. 2B is a cross-sectional view of the display device taken along the line B-B' of FIG. 2A.

Referring to FIGS. 2A and 2B, the display device 1 may include a display area DA, and a peripheral area PA around the display area DA. In one or more embodiments, the display device 1 may include a folding area FA, and the display area DA may include a first display area DA1 and a second display area DA2, which are spaced from each other with the folding area FA therebetween. At this time, the display area DA, the folding area FA, and the peripheral area PA are the same as or similar to those described in FIG. 1A and thus, a detailed description thereof will not be provided.

In one or more embodiments, the display device 1 may include a cover member 10, a panel protective member 41, an optical functional layer 42, a display panel 50, a protective film PFI, a plate 60, a digitizer 70, a cushion layer 80, an insulating film 89, and a lower cover 90. At this time, the cover member 10, the panel protective member 41, the optical functional layer 42, the display panel 50, the protective film PFI, the plate 60, the digitizer 70, the cushion layer 80, the insulating film 89, and the lower cover 90 may be the same as or similar to those described with reference to FIGS. 1A through 1C.

A first adhesive member 81 may be arranged between the cover member 10 and the optical functional layer 42, and a fifth adhesive member 88 may be arranged between the optical functional layer 42 and the display panel 50. A third adhesive member 85 may be arranged between the plate 60 and the digitizer 70, and a fourth adhesive member 87 may be arranged on the cushion layer 80 according to one or more embodiments.

In the present specification, "upward" may represent a direction in which the cover member 10 is arranged based on (e.g., relative to) the display panel 50 (e.g., a +z-direction) and "downward" may represent a direction in which the digitizer 70 is arranged based on (e.g., relative to) the display panel 50 (e.g., a −z-direction).

In one or more embodiments, the display device 1 may be formed in a planar rectangular form. For example, the display device 1 may have a rectangular plane form having a cross-section in a second direction (e.g., y-direction) that crosses a long side of the first direction (e.g., x-direction), as shown in FIG. 2A. A corner, in which the long side of the first direction (e.g., x-direction) and the short side of the second direction (e.g., y-direction) meet each other, may be formed to have a certain curvature or be at a right angle. However, the planar form of the display device 1 is not limited to a rectangle, and may be formed in a different polygonal, an elliptical, or any other suitable shape.

In one or more embodiments, the display device 1 may be provided in various suitable shapes. For example, the display device 1 may be in a form that is not variable in shape. In one or more embodiments, at least a portion of the display device 1 may be folded. In this case, the display device 1 may have an in-folding form in which the display device 1 is folded so that the display areas DA face each other, or an out-folding form in which the display device 1 is folded so that the display area DA is exposed to the outside. Hereinafter, for convenience of explanation, a case where the display device 1 has an in-folding form, will be described.

In one or more embodiments, the display device 1 may be folded based on (e.g., with respect to) or about a folding axis FAX. In this case, when the display device 1 is folded based on (e.g., with respect to) or about the folding axis FAX, the size of the display device 1 may be reduced compared to the case where the display device 1 is fully expanded (e.g., unfolded).

Thus, when the display device 1 is fully expanded (e.g., unfolded), a large display screen may be implemented, and when the display device 1 is fully folded, the display device 1 becomes smaller so that the portability of the display device 1 may be enhanced.

Figure 3A:
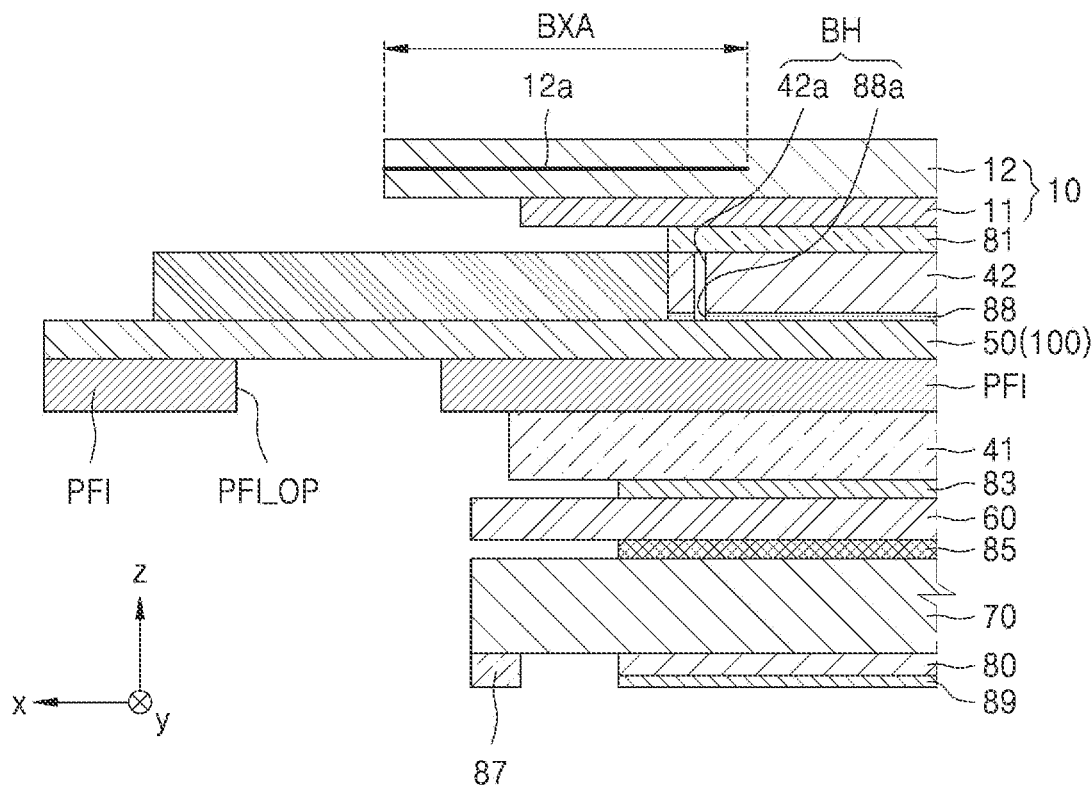
FIG. 3A is a cross-sectional view schematically illustrating a part of a display device according to embodiments.
Figure 3B:
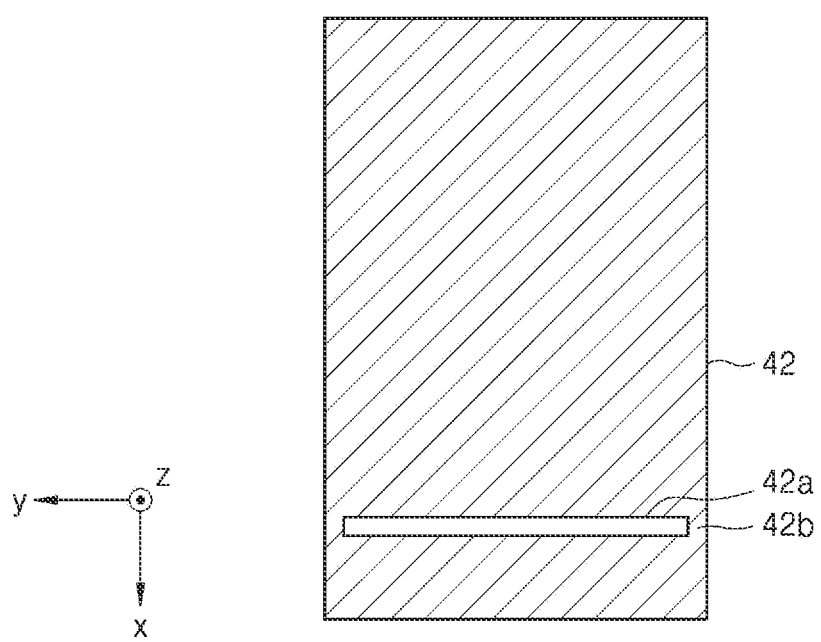
FIG. 3B is a plan view schematically illustrating an optical functional layer of a display device according to embodiments.

FIG. 3A is a cross-sectional view schematically illustrating a part of a display device according to embodiments. FIG. 3B is a plan view schematically illustrating an optical functional layer of a display device according to embodiments. FIGS. 3C through 3I are cross-sectional views schematically illustrating an optical functional layer of a display device according to embodiments.

Referring to FIGS. 3A through 3I, an accommodating portion BH may be arranged on (e.g., may be in or through) an optical functional layer 42. Also, the accommodating portion BH may be further arranged on (e.g., may further be in or be through) at least one of a fifth adhesive member 88 and a first adhesive member 81 in addition to the optical functional layer 42. Hereinafter, for convenience of explanation, a case where the accommodating portion BH is arranged on the optical functional layer 42 and the fifth adhesive member 88, will be described in more detail. In one or more embodiments, the accommodating portion BH may have a linear shape in a cross-sectional view.

The accommodating portion BH may include a first hole 42a disposed in the optical function layer 42 and a second hole 88a disposed in the fifth adhesive member 88. In this case, the first hole 42a and the second hole 88a may have a stripe form, as shown in FIG. 3B.

In this case, the optical functional layer 42 may be divided into completely two parts based on the first hole 42a. In one or more embodiments, the optical functional layer 42 may include a connection portion 42b that connects two parts of the optical functional layer 42 divided based on the first hole 42a. Hereinafter, for convenience of explanation, a case where the optical functional layer 42 includes the connection portion 42b and the first hole 42a, will be described in more detail.

The second hole 88a arranged in the fifth adhesive member 88 may be formed to correspond to the first hole 42a. In this case, the fifth adhesive member 88 may be divided into two parts that are separated from each other based on the second hole 88a. In one or more embodiments, a portion of the fifth adhesive member 88 may be disposed in a lower part of the connection portion 42b, so that the fifth adhesive member 88 that is divided into two parts based on the second hole 88a may be connected to the connection portion 42b.

The above accommodating portion BH may be in various suitable forms. For example, at least one accommodating portion BH may be provided. As shown in FIG. 3I, a plurality of accommodating portions BH may be spaced from each other. In this case, the plurality of accommodating portions BH may be arranged to overlap (e.g., overlap in the thickness direction of the optical functional layer 42) an opaque area BXA in a plan view.

The cross-sectional shape of the above accommodating portion BH may be variously formed in any suitable manner.

Figure 3C:
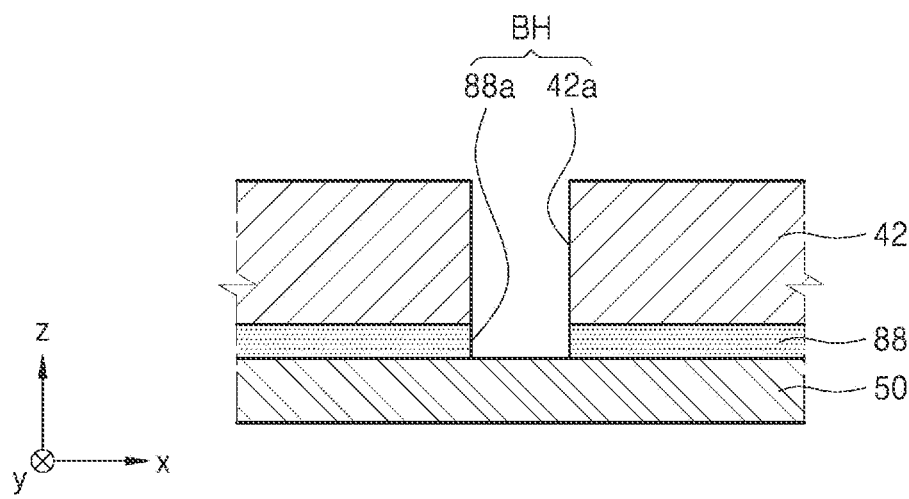
FIGS. 3C through 3I are cross-sectional views schematically illustrating an optical functional layer of a display device according to embodiments.

In one or more embodiments, the cross-sectional shape of the accommodating portion BH may be a rectangular shape, as shown in FIG. 3C. In this case, the cross-sectional shape of the accommodating portion BH is not limited to a rectangular shape, as shown in FIG. 3C, but may include a general rectangular shape, a square shape, and/or the like.

Figure 3D:
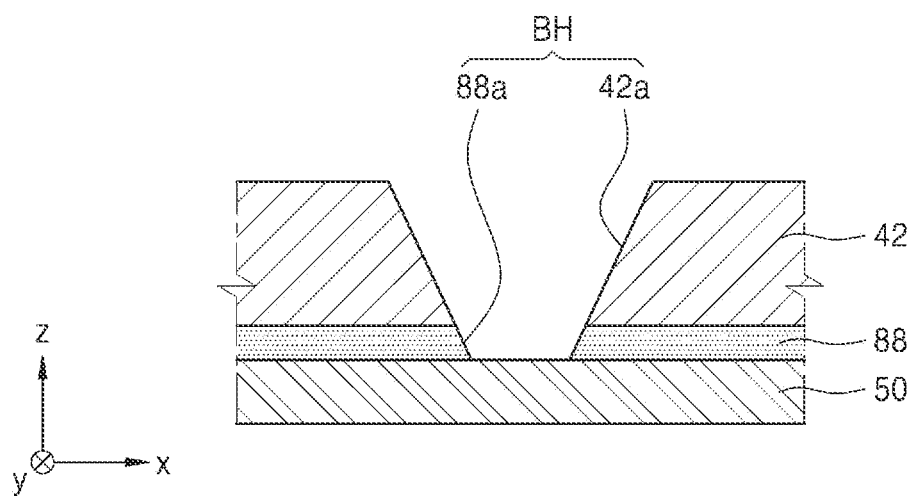

In one or more embodiments, the cross-sectional shape of the accommodating portion BH may be a trapezoidal shape, as shown in FIG. 3D. In this case, at least one of an inner surface of the accommodating portion BH may be inclined. In particular, the inner surface extending in the longitudinal direction of the first hole 42a shown in FIG. 3D may be inclined.

Figure 3E:
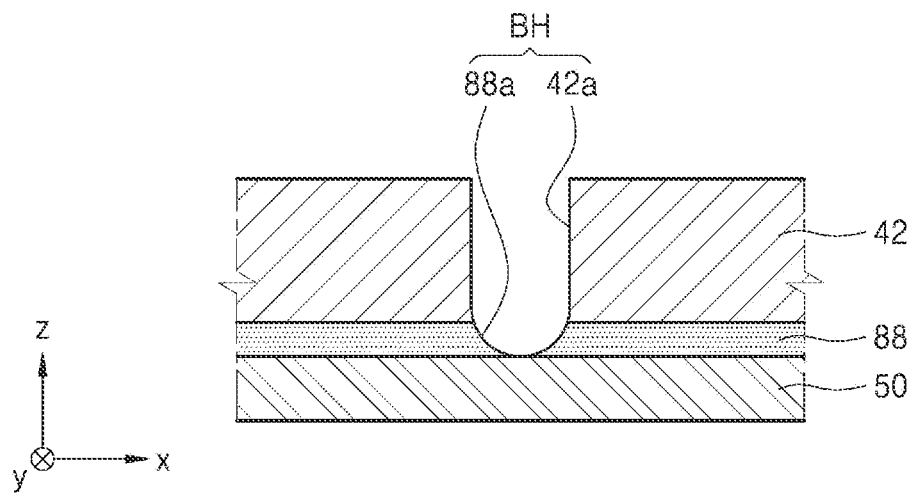

In one or more embodiments, the cross-sectional shape of the accommodating portion BH may be a curved shape in which at least a portion of the accommodating portion BH is curved, as shown in FIG. 3E. In this case, the shape of the cross-section of the accommodating portion BH may be a shape such as a semicircle, a cup shape, or a part of an ellipse. At this time, a portion including the curved surface of the accommodating portion BH may be disposed on at least one of the first hole 42a and the second hole 88a.

Figure 3F:
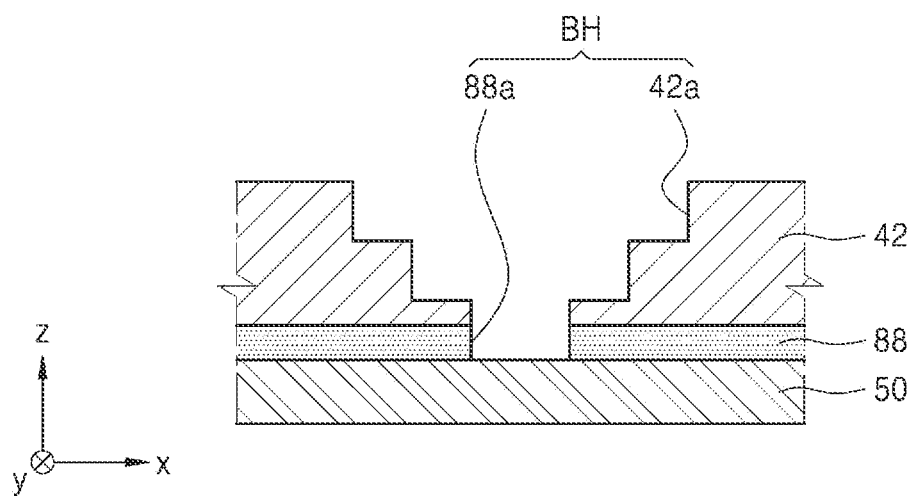

In one or more embodiments, the cross-sectional shape of the accommodating portion BH may be a stepped shape, as shown in FIG. 3F. At this time, the inner surface of the accommodating portion BH may be in the form of a step. In this case, the stepped inner surface of the accommodating portion BH may be at least one of an inner surface of the first hole 42a and an inner surface of the second hole 88a. In this case, the width (e.g., width in the x-direction) of the accommodating portion BH may decrease as it gets closer to the display panel 50.

Figure 3G:
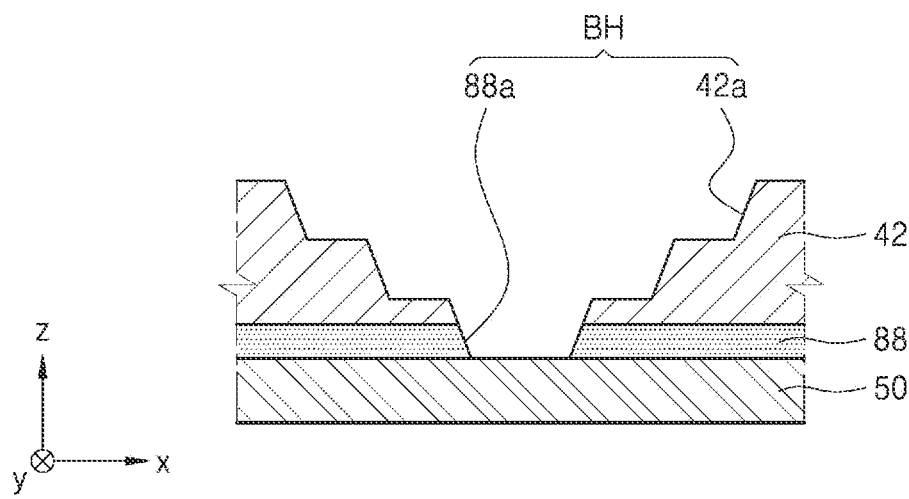

In one or more embodiments, the cross-sectional shape of the accommodating portion BH may be a stepped shape, as shown in FIG. 3G, and an inner surface of the accommodating portion BH connecting a step height may be inclined. In this case, the width (e.g., width in the x-direction) of the accommodating portion BH may decrease as it gets closer to the display panel 50.

Figure 3H:
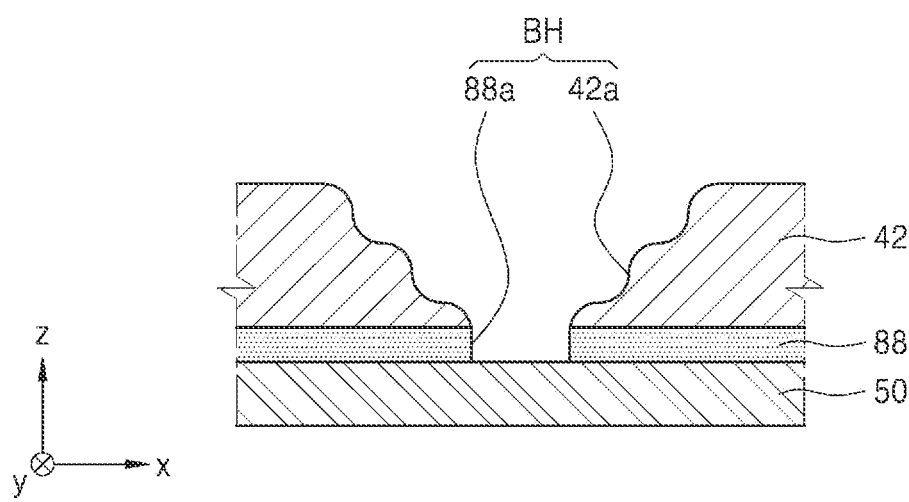
Figure 3I:
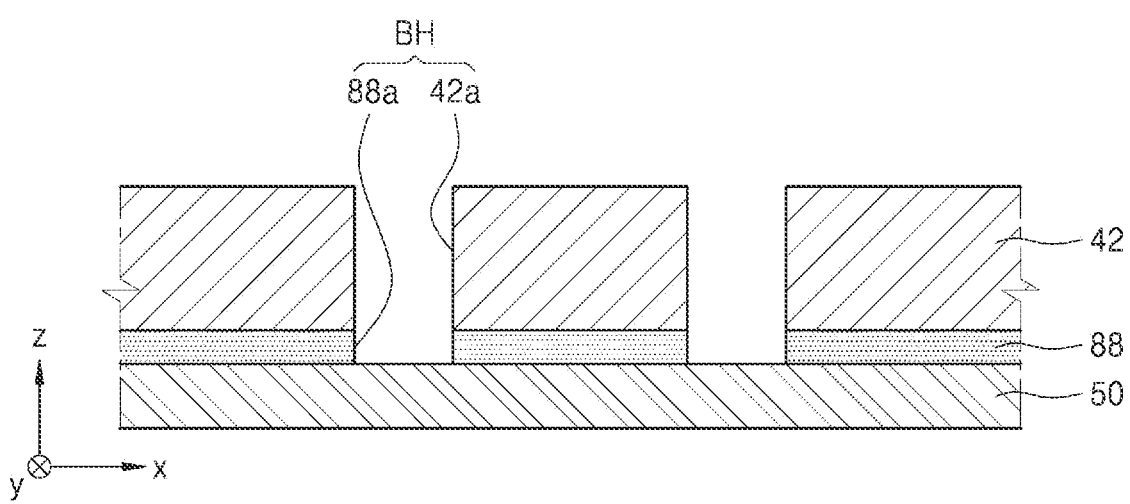

In one or more embodiments, the cross-sectional shape of the accommodating portion BH may be a stepped shape, as shown in FIG. 3H, and a portion where inner surfaces of the accommodating portion BH connecting a step height are connected to each other, may be formed to be round. At this time, the inner surfaces connecting the step height in the accommodating portion BH may be inclined or a straight line.

In connection with the above, the cross-sectional shape of the accommodating portion BH is not limited thereto. For example, the cross-sectional shape of the accommodating portion BH may also be a triangular shape. In one or more embodiments, the cross-sectional shape of the accommodating portion BH may also be a polygonal shape.

Figure 4:
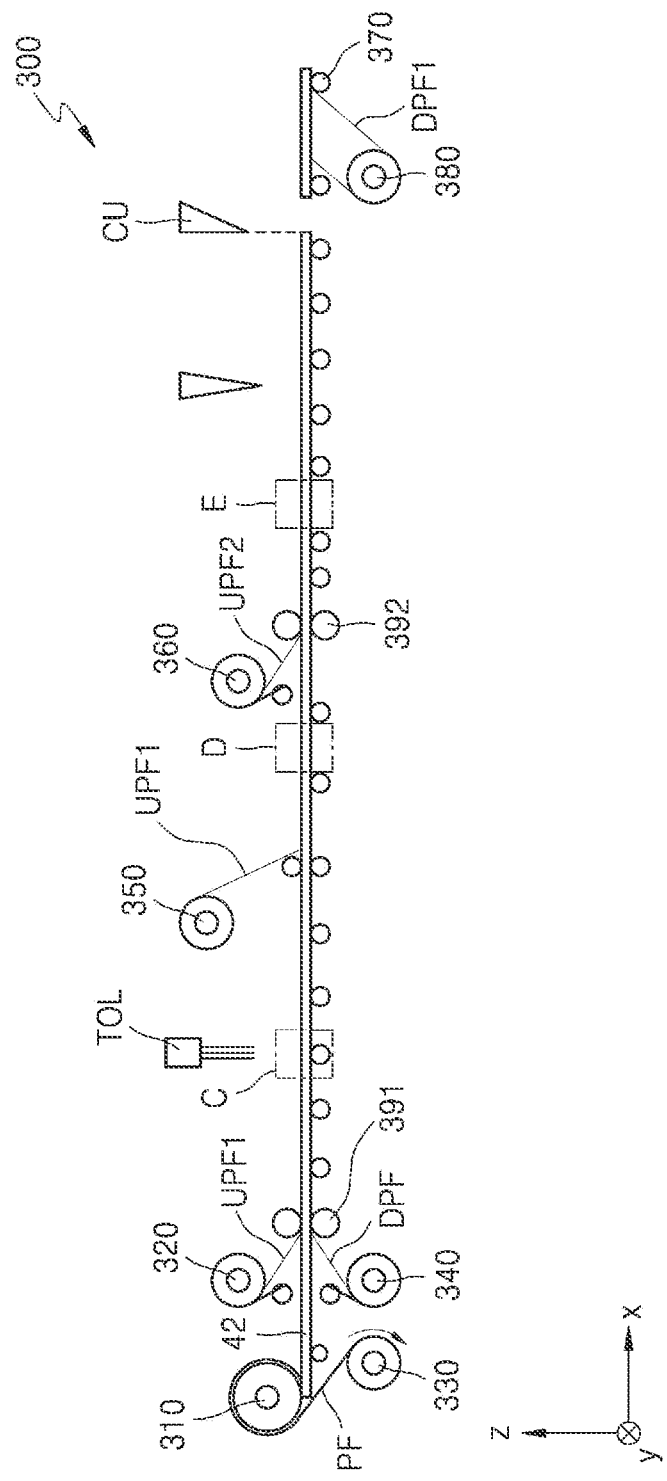
FIG. 4 is a front view illustrating an apparatus for manufacturing a display device according to embodiments.

FIG. 4 is a front view illustrating an apparatus for manufacturing a display device according to embodiments. FIGS. 5A through 5F are cross-sectional views illustrating a part of a method of manufacturing a display device according to one or more embodiments.

Figure 5A:
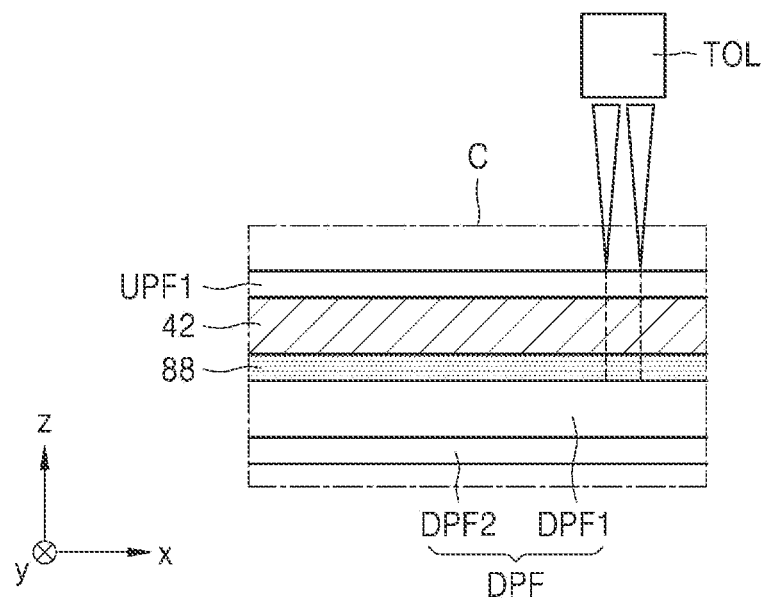
FIGS. 5A through 5F are cross-sectional views illustrating a part of a method of manufacturing a display device according to one or more embodiments.
Figure 5B:
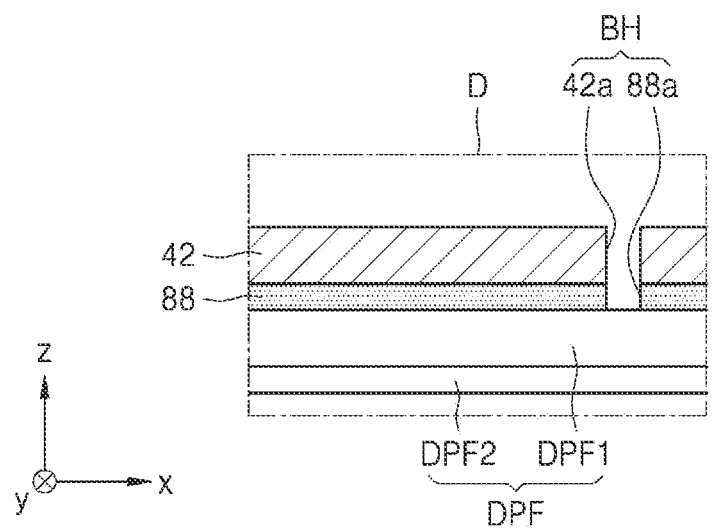
Figure 5C:
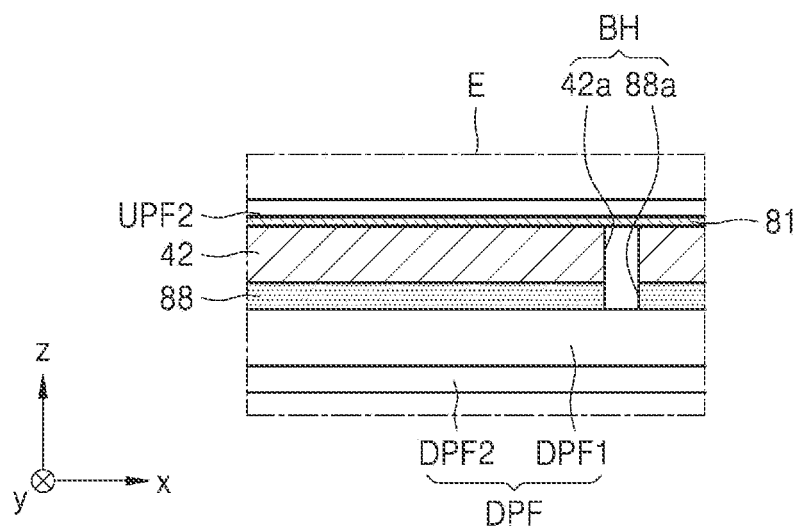
Figure 5D:
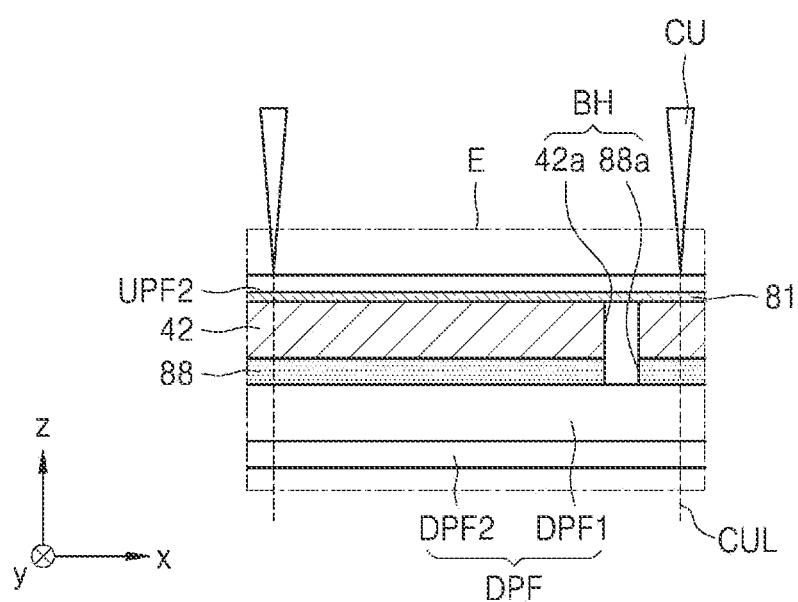
Figure 5E:
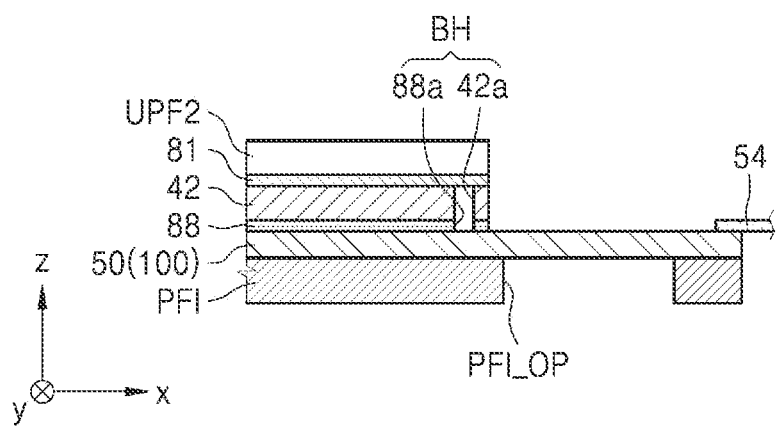
Figure 5F:
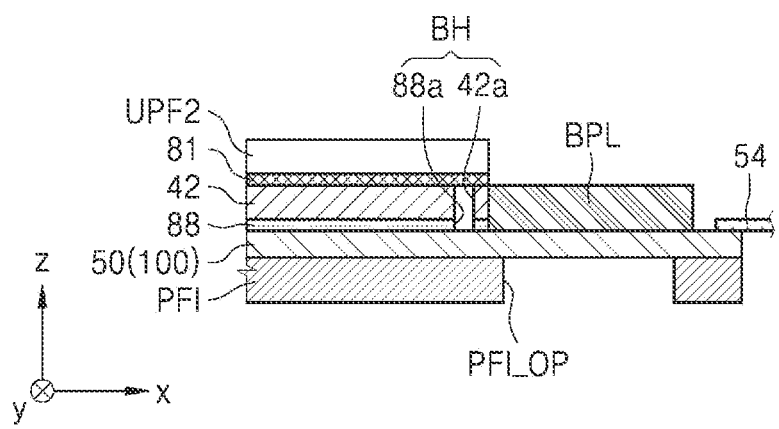

Referring to FIGS. 4 through 5F, an apparatus 300 for manufacturing a display device may include a first supply unit 310, a second supply unit 320, a first removal unit 330, a third supply unit 340, a second removal unit 350, a fourth supply unit 360, a transfer unit 380, a third removal unit 370, a member removal unit TOL, and a cutting portion CU.

The first supply unit 310 may provide an optical functional layer 42. At this time, the first supply unit 310 may include a roller where the optical functional layer 42 is wound. Furthermore, the first supply unit 310 may include a motor that is connected to the roller to rotate the roller, thereby moving the optical functional layer 42. In this case, a separate optical functional layer protective film PF may be disposed on the optical functional layer 42.

The second supply unit 320 may supply a first upper cover film UPF1 to the optical functional layer 42. At this time, the first upper cover film UPF1 may be disposed on a first surface, such as the upper surface of the optical functional layer 42 to protect the optical functional layer 42. In this case, a separate adhesive member may be arranged in the first upper cover film UPF1 to be combined with the optical functional layer 42. In this case, a separate first lamination unit 391 may be disposed to laminate the first upper cover film UPF1 and the optical functional layer 42 to each other. At this time, the first lamination unit 391 may include a pair of rollers arranged to face each other.

The first removal unit 330 may remove the optical functional layer protective film PF. For example, the first removal unit 330 may include a first removal roller and a first motor connected to the first removal roller, and may be connected to one end of the optical functional layer protective film PF to remove the optical functional layer protective film PF from the optical functional layer 42.

The third supply unit 340 may supply a lower cover film DPF to a second surface, such as a lower surface of the optical functional layer 42. At this time, the lower cover film DPF supplied from the third supply unit 340 may include a first lower cover film DPF1 and a second lower cover film DPF2 to be stacked on each other. In one or more embodiments, the lower cover film DPF may include a fifth adhesive member 88 disposed on the first lower cover film DPF1. In one or more embodiments, the fifth adhesive member 88 may be disposed on the second lower cover film DPF2 with the first lower cover film DPF1 therebetween. In the above case, a first lamination unit 391 may laminate the lower cover film DPF supplied by the third supply unit 340 and the first upper cover film UPF1 concurrently (e.g., simultaneously) on the optical functional layer 42.

The second removal unit 350 may remove the first upper cover film UPF1 from the optical functional layer 42. At this time, the second removal unit 350 may include a second removal roller and a second motor connected to the second removal roller to rotate the second removal roller.

The fourth supply unit 360 may supply a second upper cover film UPF2 to the optical functional layer 42. At this time, the second upper cover film UPF2 may include a first adhesive member 81 on a lower portion thereof. In this case, a second lamination unit 392 may laminate the second upper cover film UPF2 on an upper surface of the optical functional layer 42. At this time, the second lamination unit 392 may be the same as or similar to the first lamination unit 391 described above.

The third removal unit 370 may remove the first lower cover film DPF1 of the lower cover film DPF. At this time, the third removal unit 370 may include a third removal roller and a third motor connected to the third removal roller to rotate the third removal roller. In this case, the third removal roller may have a shape in which a portion of the first lower cover film DPF1 is adsorbed. For example, a portion of the first lower cover film DPF1 may adhere to the third removal roller.

The member removal unit TOL may be disposed between the third supply unit 340 and the second removal unit 350 to remove a part of the first upper cover film UPF1, a part of the optical functional layer 42, and a part of the lower cover film DPF. At this time, the member removal unit TOL may be in various suitable forms. For example, the member removal unit TOL may include a laser cutting machine for supplying a laser. In one or more embodiments, the member removal unit TOL may include a removal device that physically removes a member via a blade.

The transfer unit 380 may transfer the optical functional layer 42. At this time, the transfer unit 380 may be in various suitable forms such as a conveyor belt, a transfer roller, and/or the like.

The cutting portion CU may cut the optical functional layer 42 transferred by the transfer unit 380 to a constant size along a virtual cutting line CUL. At this time, the cutting portion CU may include a mechanical cutting machine including a laser cutting machine, a blade, and/or the like.

On the other hand, when a display device is manufactured through the apparatus 300 of manufacturing the display device, an accommodating portion BH may be formed on (e.g., may be in or through) the optical functional layer 42.

For example, when the first supply unit 310 supplies the optical functional layer 42 to the transfer unit 380, the optical functional layer protective film PF on the optical functional layer 42 may be removed by the first removal unit 330. Then, the first upper cover film UFP1 and the lower cover film DPF may be supplied to the optical functional layer 42 through the second supply unit 320 and the third supply unit 340. At this time, the first lamination unit 391 may laminate the first upper cover film UPF1 and the lower cover film DPF on opposite sides of the optical functional layer 42.

Referring to FIG. 5A, the first upper cover film UPF1 and the lower cover film DPF may be laminated as described above and then, at least a part of the first upper cover film UPF1, at least a part of the optical functional layer 42, and at least a part of the fifth adhesive member 88 may be removed by the member removal unit TOL. Thereafter, the first upper cover film UPF1, at least a part of the optical functional layer 42, and at least a part of the fifth adhesive member 88, which are removed through a separate adsorption unit, may be carried out to the outside to form the accommodating portion BH.

Referring to FIG. 5B, the first upper cover film UPF1 may be removed through the second removal unit 350 after the above procedure is completed. At this time, the first upper cover film UPF1 may be in a form in which at least a part of the first upper cover film UPF1 is removed, and the first upper cover film UPF1 that is divided based on the removed portion of the first upper cover film UPF1 may be in a form in which the first upper cover films UPF1 (e.g., the first upper cover films UPF1 separated by the removed portion of the first upper cover film UPF1) are arranged to be connected to each other. In this case, the first removal unit 330 may not include (e.g., may exclude) the first removal roller and the first motor described above but may include a rotatable drum and a driving unit for linearly moving the drum. In this case, an adhesive layer may be disposed on the drum, and the adhesive layer may be selectively in contact with the first upper cover film UPF1, and the drum linearly moves when the driving unit operates, so that the first upper cover film UPF1 may be removed from the optical functional layer 42. At this time, although not described above, the second removal unit 350 and the third removal unit 370 may also include a drum and a driving unit similar to that of the first removal unit 330.

When the first upper cover film UPF1 is removed as described above, the first hole 42a of the optical functional layer 42 may be exposed to the outside, as shown in FIG. 5B.

Referring to FIG. 5C, subsequently, the fourth supply unit 360 may supply the second upper cover film UPF2 to the optical functional layer 42, and the second upper cover film UPF2 may be laminated on the optical functional layer 42 through the second lamination unit 392. In this case, the accommodating portions BH, as shown in FIG. 5C, may be shielded by the second upper cover film UPF2. In this case, the second lower cover film DPF2, the optical functional layer 42, and the second upper cover film UPF2 may be stacked together.

After the above procedure is completed, the optical functional layer 42 in which the second upper cover film UPF2 is disposed, may be cut using the cutting portion CU, as shown in FIG. 5D. For example, the optical functional layer 42 may be partitioned and cut to a desired or suitable length (e.g., the x direction of FIG. 4) and a desired or suitable width (e.g., the y direction of FIG. 4). For example, the second lower cover film DPF2, the optical functional layer 42, and the second upper cover film UPF2 may be cut to a certain length.

After the above procedure is completed, the optical functional layer 42 may be disposed on the display panel 50, as shown in FIG. 5E. At this time, the second lower cover film DPF2 may be removed from the optical functional layer 42, and the optical functional layer 42 may be disposed on the display panel 50 in a state in which the fifth adhesive member 88 is disposed at a lower portion of the optical functional layer 42 so that the optical functional layer 42 may be combined with the display panel 50. In one or more embodiments, the first lower cover film DPF1 may also be removed.

After the above procedure is completed, the bending protective layer BPL may be formed so as to contact the end of the optical functional layer 42, as shown in FIG. 5F. At this time, the bending protective layer BPL may be disposed on the display panel 50 by including a resin material and then may be cured by ultraviolet rays, heat, and/or the like.

As described above, after the bending protective layer BPL is disposed on the display panel 50, the second upper cover film UPF2 may be removed and then, the cover member 10 may be arranged and attached to the display panel 50. Also, a panel protective member 41, a plate 60, a digitizer 70, and a cushion layer 80 may be disposed below the protective film PFI disposed under the display panel 50. In this case, the above shape may be similar to the shape shown in FIG. 3A. In one or more embodiments, the panel protective member 41, the plate 60, the digitizer 70, and the cushion layer 80 may also be arranged on the display panel 50 before the bending protective layer BPL is formed. In one or more embodiments, after at least one of the panel protective member 41, the plate 60, the digitizer 70, and the cushion layer 80 are attached to the display panel 50, the bending protective layer BPL may be formed.

As described above, after the bending protective layer BPL is disposed on the substrate 100, the substrate 100 of the display panel 50 in which the bending protective layer BPL is disposed, may be bent. At this time, the form in which the substrate 100 is bent, may be the same as those shown in FIG. 1C or FIG. 2B described above.

Even in the case of bending the substrate 100, the accommodating portion BH may accommodate a part of force applied to the optical functional layer 42 by the bending protective layer BPL so that the cover member 10 may be prevented or substantially prevented from being lifted.

Figure 6:
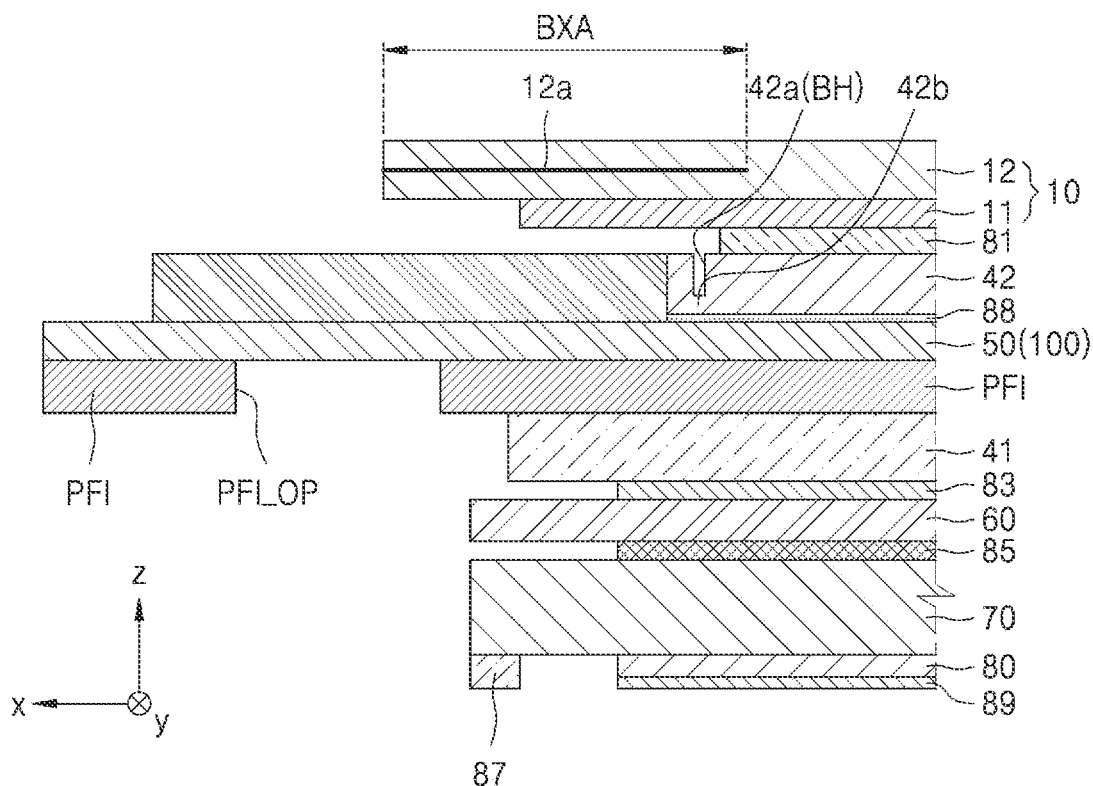
FIG. 6 is a cross-sectional view schematically illustrating a part of a display device according to embodiments.
Figure 7A:
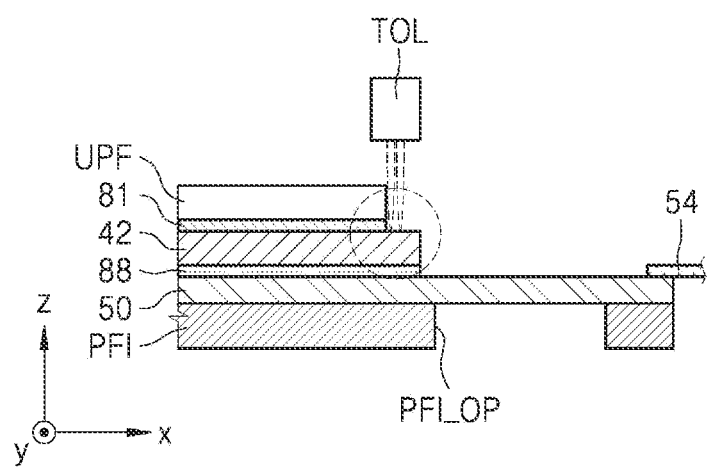
FIGS. 7A through 7C are cross-sectional views illustrating a part of a method of manufacturing a display device according to one or more embodiments.
Figure 7B:
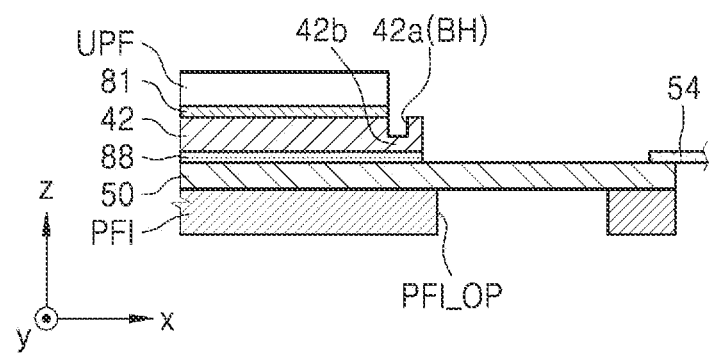
Figure 7C:
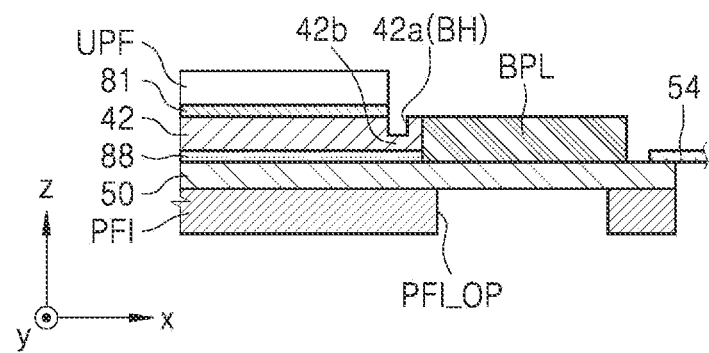

FIG. 6 is a cross-sectional view schematically illustrating a part of a display device according to embodiments. FIGS. 7A through 7C are cross-sectional views illustrating a part of a method of manufacturing a display device according to one or more embodiments.

Referring to FIG. 6, the display device 1 may include a cover member 10, a panel protective member 41, an optical functional layer 42, a display panel 50, a protective film PFI, a plate 60, a digitizer 70, a cushion layer 80, an insulating film 89, and a lower cover. At this time, the cover member 10, the panel protective member 41, the optical functional layer 42, the display panel 50, the protective film PFI, the plate 60, the digitizer 70, the cushion layer 80, the insulating film 89, and the lower cover may be the same as or similar to those described with reference to FIGS. 1A through 1C.

A first adhesive member 81 may be arranged between the cover member 10 and the optical functional layer 42, and a fifth adhesive member 88 may be arranged between the optical functional layer 42 and the display panel 50. A second adhesive member 83 may be disposed between the panel protection member 41 and the plate 60, and a third adhesive member 85 may be disposed between the plate 60 and the digitizer 70, and a fourth adhesive member 87 may be disposed on the cushion layer 80 according to one or more embodiments. In one or more embodiments, the first adhesive member 81 may be configured to expose the accommodating portion BH to an outside.

In the above case, the accommodating portion BH may be disposed on (e.g., may be in or through) the optical functional layer 42. In this case, the accommodating portion BH may have a shape in which only a part of the optical functional layer 42 is removed in the thickness direction of the optical functional layer 42. For example, a part of the accommodating portion BH may include a first hole or a first groove 42a. In this case, a part of the accommodating portion BH may be disposed on (e.g., may be in or through) a bottom surface of the first hole 42a.

Referring to FIG. 7A, in a method of manufacturing the optical functional layer 42 including the above-mentioned accommodating portion BH, the upper cover film UPF may be disposed on an upper surface of the optical functional layer 42, and the optical functional layer 42 in which a second lower cover film DPF2 is disposed on the lower surface of the optical functional layer 42, may be prepared. At this time, the above-mentioned optical functional layer 42 may be manufactured through an apparatus 300 for manufacturing a display device having a structure similar to that of the display device shown in FIG. 4.

After the second lower cover film DPF2 is removed from the optical functional layer 42 disposed on the second lower cover film DPF2, the optical functional layer 42 may be disposed on and attached to the display panel 50. In this case, the fifth adhesive member 88 may be disposed between the optical functional layer 42 and the display panel 50.

In the above case, the upper cover film UPF may be disposed on the optical functional layer 42. The end of the upper cover film UPF may be disposed at a position different from the end of the optical functional layer 42. For example, the end of the second upper cover film UPF2 of the upper cover film UPF may be farther from the end of the display panel 50 than the end of the optical functional layer 42 is to the end of the display panel 50 as shown in, for example, FIG. 7A. In this case, the edge region on the upper surface of the optical functional layer 42 adjacent to the end of the optical functional layer 42 may be exposed to the outside.

As described above, at least a portion of the upper surface of the optical functional layer 42 exposed to the outside may be removed by the member removal unit TOL. At this time, the member removal unit TOL may use a laser, or a blade and/or the like. In this case, an accommodating portion BH may be disposed on (e.g., may be in or through) the optical functional layer 42. The accommodating portion BH may be arranged to overlap an opaque area BXA in which an opaque layer 12a is disposed.

Referring to FIG. 7B, when a portion of the optical functional layer 42 is removed as described above, the accommodating portion BH may be disposed only on the optical functional layer 42. At this time, the upper portion of the optical functional layer 42 may be exposed to the outside.

Referring to FIG. 7C, the bending protection layer BPL may be disposed on the display panel 50 after the accommodating portion BH is formed. At this time, a process of disposing the bending protective layer BPL on the display panel 50 is the same as or similar to that described above, and a detailed description thereof will not be provided.

After the above procedure is completed, the upper cover film UPF on the optical functional layer 42 may be removed. Subsequently, the cover member 10 may be disposed on the optical functional layer 42 and fixed thereto.

In one or more embodiments, the plate 60, the digitizer 70, the cushion layer 80, and the insulating film 89 may be disposed on the lower surface of the display panel 50. In this case, at least one of the plate 60, the digitizer 70, the cushion layer 80, and the insulating film 89 may be disposed on the lower surface of the display panel 50 after the bending protective layer BPL is disposed, or may be disposed on the lower surface of the display panel 50 before the bending protective layer BPL is disposed.

When the above procedure is completed, the display circuit board 51 may be placed on the lower surface of the cushion layer 80 by bending the substrate 100 of the display panel 50.

At this time, the above accommodating portion BH may have various suitable forms, as shown in FIGS. 3B through 3I. In one or more embodiments, the accommodating portion BH may absorb some of the force to be applied to the optical functional layer 42 by the bending protective layer BPL during bending of the substrate 100.

Figure 8:
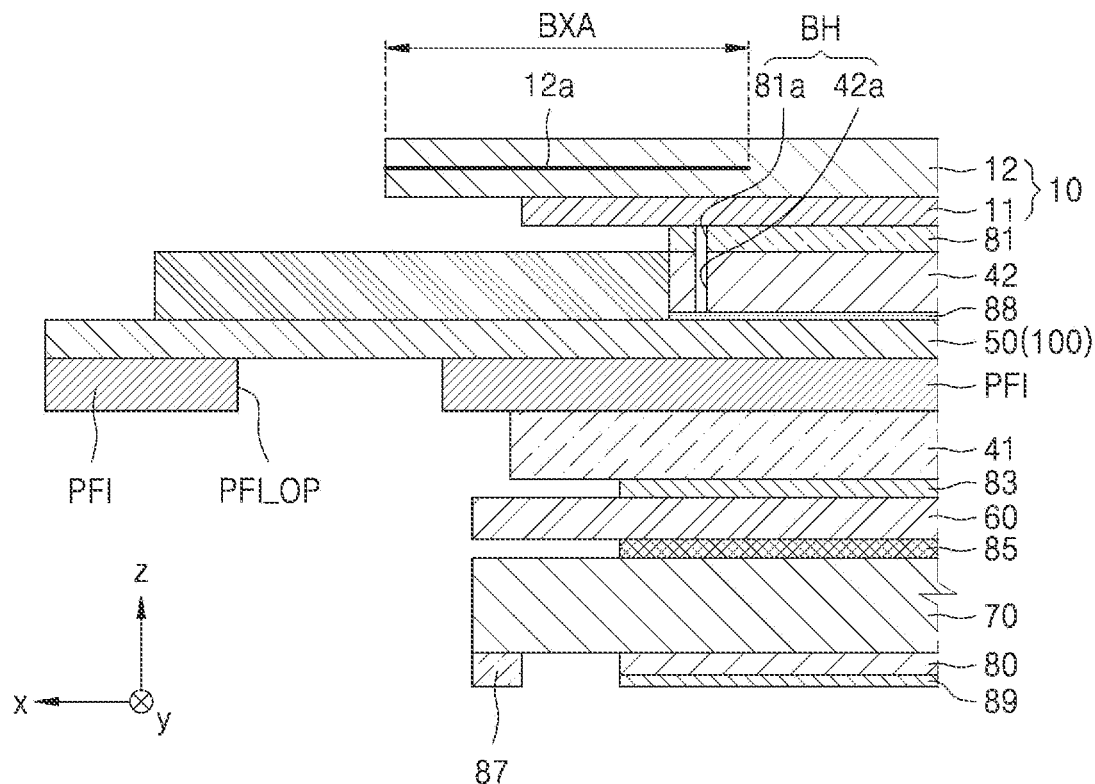
FIG. 8 is a cross-sectional view schematically illustrating a part of a display device according to embodiments.
Figure 9A:
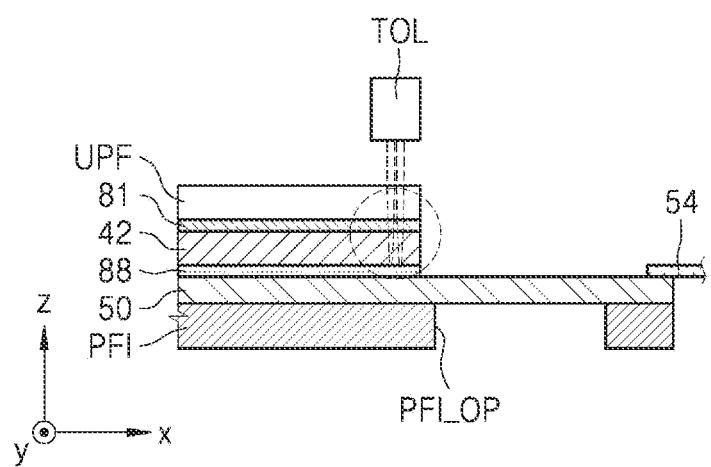
FIGS. 9A through 9C are cross-sectional views illustrating a part of a method of manufacturing a display device according to one or more embodiments.
Figure 9B:
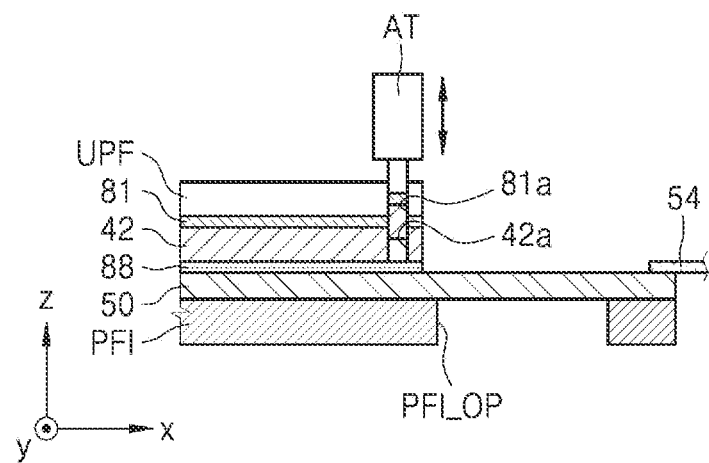
Figure 9C:
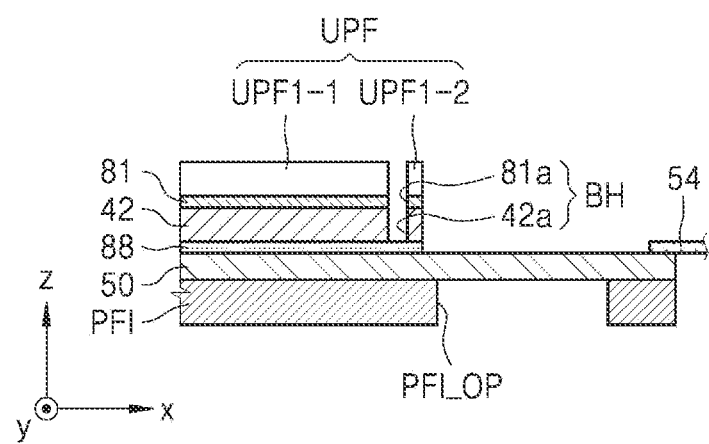

FIG. 8 is a cross-sectional view schematically illustrating a part of a display device according to embodiments. FIGS. 9A through 9C are cross-sectional views illustrating a part of a method of manufacturing a display device according to one or more embodiments.

Referring to FIG. 8, the display device 1 may include a cover member 10, a panel protective member 41, an optical functional layer 42, a display panel 50, a protective film PFI, a plate 60, a digitizer 70, a cushion layer 80, an insulating film 89, and a lower cover. At this time, the cover member 10, the panel protective member 41, the optical functional layer 42, the display panel 50, the protective film PFI, the plate 60, the digitizer 70, the cushion layer 80, the insulating film 89, and the lower cover may be the same as or similar to those described with reference to FIGS. 1A through 1C.

A first adhesive member 81 may be arranged between the cover member 10 and the optical functional layer 42, and a fifth adhesive member 88 may be arranged between the optical functional layer 42 and the display panel 50. A second adhesive member 83 may be disposed between the panel protection member 41 and the plate 60, and a third adhesive member 85 may be disposed between the plate 60 and the digitizer 70, and a fourth adhesive member 87 may be disposed on the cushion layer 80 according to one or more embodiments.

In the above case, the accommodating portion BH may be disposed on (e.g., may be in or through) the optical functional layer 42 and the first adhesive member 81. In this case, the accommodating portion BH may have a shape in which the first adhesive member 81 and a part of the optical functional layer 42 are removed in the thickness direction of the optical functional layer 42. For example, the accommodating portion BH may include a first hole 42a disposed in the optical function layer 42 and a third hole 81a disposed in the first adhesive member 81.

Referring to FIG. 9A, in a method of manufacturing the optical functional layer 42 including the above-mentioned accommodating portion BH, the upper cover film UPF may be disposed on an upper surface of the optical functional layer 42, and the optical functional layer 42 in which a second lower cover film DPF2 is disposed on the lower surface of the optical functional layer 42, may be prepared. At this time, the above-mentioned optical functional layer 42 may be manufactured through an apparatus 300 for manufacturing a display device having a structure similar to that of the display device shown in FIG. 4.

After the second lower cover film DPF2 is removed from the optical functional layer 42 disposed on the second lower cover film DPF2, the optical functional layer 42 may be disposed on and attached to the display panel 50. In this case, the fifth adhesive member 88 may be disposed between the optical functional layer 42 and the display panel 50.

In the above case, the upper cover film UPF may be disposed on the optical functional layer 42. The upper cover film UPF described above may correspond to the planar shape of the optical functional layer 42.

The upper cover film UPF and the optical function layer 42 that are stacked on each other as described above may be removed by the member removal unit TOL. At this time, the member removal unit TOL may use a laser, or a blade and/or the like.

Referring to FIG. 9B, when the member removal unit TOL is used as described above, a portion of the upper cover film UPF and a portion of the optical functional layer 42 are removed and then, a portion of the upper cover film UPF and a portion of the optical functional layer 42, which are removed by the separation unit AT, may be separated from another portion of the upper cover film UPF and another portion of the optical functional layer 42, which are disposed on the display panel 50. At this time, the separation unit AT may include an adhesive chuck, an adsorption chuck using a pneumatic pressure, and/or the like.

In the above case, the accommodating portion BH may be formed on (e.g., may be in or through) the optical functional layer 42 and the first adhesive member 81. In this case, the accommodating portion BH may be arranged to overlap an opaque area BXA in which an opaque layer 12a is disposed, in a plan view.

Referring to FIG. 9C, the bending protection layer BPL may be disposed on the display panel 50 after the accommodating portion BH is formed. At this time, the bending protective layer BPL may be disposed on the display panel 50 while the upper cover film UPF is removed, or the bending protective layer BPL may be disposed on the display panel 50 in a state in which the upper cover film UPF is not removed. At this time, a process of disposing the bending protective layer BPL on the display panel 50 is the same as or similar to that described above, and a detailed description thereof will not be provided. In one or more embodiments, hereinafter, for convenience of explanation, a case where the bending protective layer BPL is disposed on the display panel 50 in a state in which the upper cover film UPF is not removed, will be described in more detail.

After the above procedure is completed, the upper cover film UPF on the optical functional layer 42 may be removed. At this time, the upper cover film UPF may include a first upper cover film region UPF1-1 and a second upper cover film region UPF1-2 that are separated from each other based on the third hole 81a.

When the upper cover film UPF is entirely removed as described above, the first adhesive member 81 may be exposed to the outside, and after the cover member 10 may be disposed on the first adhesive member 81, the cover member 10 may be fixed to the first adhesive member 81.

In one or more embodiments, the plate 60, the digitizer 70, the cushion layer 80, and the insulating film 89 may be disposed on the lower surface of the display panel 50. In this case, at least one of the plate 60, the digitizer 70, the cushion layer 80, and the insulating film 89 may be disposed on the lower surface of the display panel 50 after the bending protective layer BPL is disposed, or may be disposed on the lower surface of the display panel 50 before the bending protective layer BPL is disposed.

When the above procedure is completed, the display circuit board 51 may be placed on the lower surface of the cushion layer 80 by bending the substrate 100 of the display panel 50.

At this time, the above accommodating portion BH may have various suitable forms, as shown in FIGS. 3B through 3I. In one or more embodiments, the accommodating portion BH may absorb some of the force to be applied to the optical functional layer 42 by the bending protective layer BPL during bending of the substrate 100.

Figure 10:
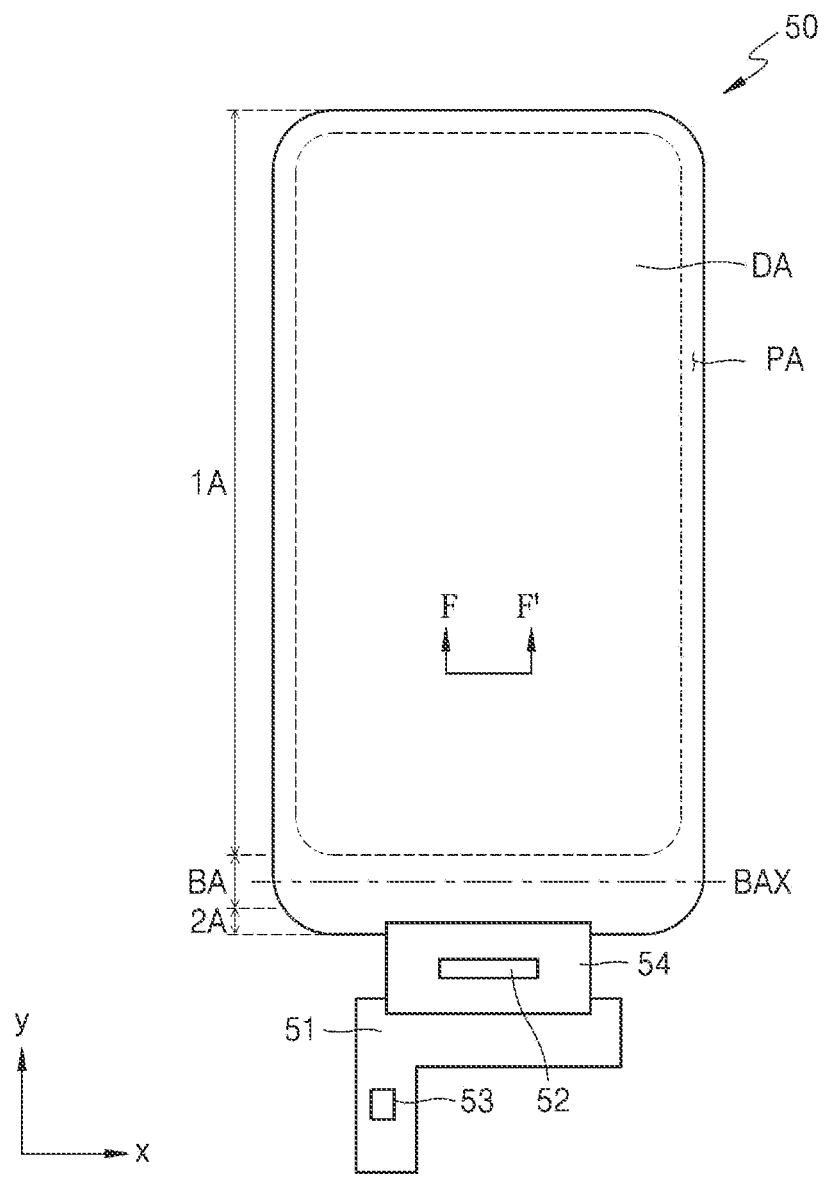
FIG. 10 is a plan view illustrating a display panel according to embodiments.
Figure 11:
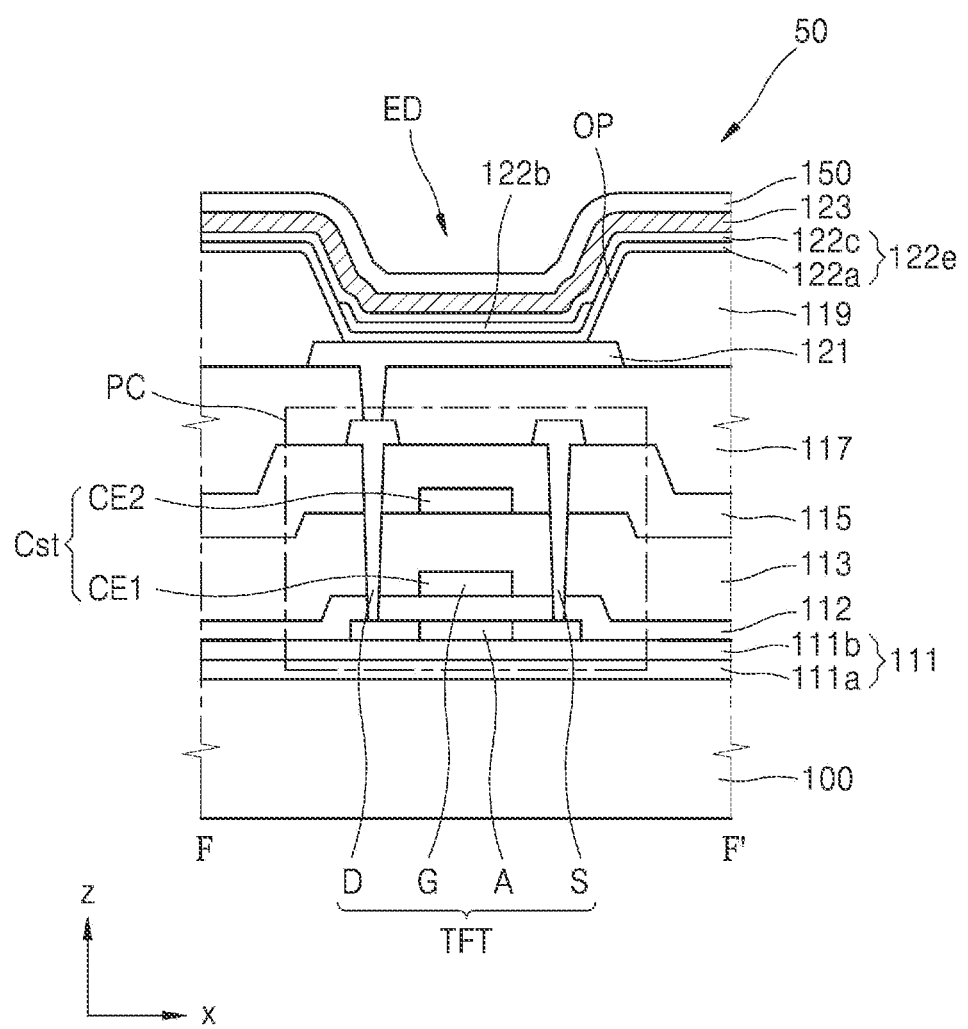
FIG. 11 is a cross-sectional view of the display panel taken along the line C-C' of FIG. 10.

FIG. 10 is a plan view illustrating a display panel according to embodiments. FIG. 11 is a cross-sectional view of the display panel taken along the line C-C' of FIG. 10.

Referring to FIGS. 10 and 11, the display panel 50 may be disposed below the cover member 10. In one or more embodiments, it may be understood that the display panel 50 of the display device 1 includes a display area DA and a peripheral area PA. Thus, display elements may be disposed in the display area DA of the display panel 50 to display an image, and no display elements may be placed in the peripheral area PA of the display panel 50, so that no image may be displayed in the peripheral area PA.

The display panel 50 described above may include a first area (e.g., a first region) 1A including the display area DA and a part of the peripheral area PA adjacent to the display area DA, a bending area BA including a bending axis BAX while being bent in the peripheral area PA, and a second area (e.g., a second region) 2A which is connected to the bending area BA and arranged in the peripheral area PA and in which terminals are arranged. At this time, the first area 1A may be an area where a flat state or a folded state is maintained.

In one or more embodiments, the display panel 50 may include display elements. At this time, the display elements may be a light emitting display panel including an emitting diode. In one or more embodiments, the display panel 50 may be an organic light emitting display panel using an organic light emitting diode including an organic light emitting layer, an ultra-small light emitting display panel using a microfluidic light emitting display panel, a quantum dot light emitting display panel using a quantum dot light emitting diode including a quantum dot light emitting layer, or an inorganic light emitting display panel using an inorganic light emitting device including an inorganic semiconductor.

In one or more embodiments, the display panel 50 may be a rigid display panel that has rigidity and is not easily bent, or a flexible display panel that has flexibility and may be easily folded or rolled. For example, the display panel 50 may be a foldable display panel, a curved display panel having a bent display surface, a bendable display panel in which areas other than a display surface are bent, a rollable display panel, or a stretchable display panel.

The display panel 50 may be transparent and may be a transparent display panel in which an object or a background disposed on the lower surface of the display panel 50 may be viewed from the upper surface of the display panel 50. In one or more embodiments, the display panel 50 may be a reflective display panel capable of reflecting objects or backgrounds on the upper surface of the display panel 50.

In one or more embodiments, a first ductile film 54 may be attached to one edge of the display panel 50. One side of the first ductile film 54 may be attached to one edge of the display panel 50 using an anisotropic conductive film. The first ductile film 54 may be a flexible film that may be bent.

In one or more embodiments, the display driving unit 52 may be disposed on the first ductile film 54. The display driving unit 52 may receive control signals and power supply voltages and generate signals and voltages for driving the display panel 50. The display driving unit 52 may be formed of an integrated circuit (IC).

In one or more embodiments, the display circuit board 51 may be attached to the other side of the first ductile film 54. The other side of the first ductile film 54 may be attached to the upper surface of the display circuit board 51 using an anisotropic conductive film. The display circuit board 51 may be a flexible printed circuit board (FPCB) that may be bent, a rigid PCB that is rigid and is not bent, or a composite PCB that includes both the rigid PCB and the FPCB.

In one or more embodiments, a touch sensor driving unit (e.g., a touch sensor driving portion or a touch sensor driving circuit) 53 may be disposed on the display circuit board 51. The touch sensor driving unit 53 may be formed of an integrated circuit. The touch sensor driving unit 53 may be attached to the display circuit board 51. The touch sensor driving unit 53 may be connected (e.g., electrically connected) to touch electrodes of a touch screen layer of the display panel 50 through the display circuit board 51.

The touch screen layer of the display panel 50 may detect a user's touch input using at least one of a variety of touch methods, such as a resistive film, a capacitive capacity method, and/or the like. For example, when the touch screen layer of the display panel 50 detects a user's touch input in a capacitive manner, the touch sensor driving unit 53 may apply driving signals to driving electrodes of the touch electrodes and may detect voltages charged in mutual capacitance (hereinafter, referred to as "mutual capacitance") between the driving electrodes and the sensing electrodes through the sensing electrodes, thereby determining whether the user touches. The user's touch may include a contact touch and a proximity touch. The contact touch indicates that objects such as a user's finger or pen are in direct contact with the cover member 10 being disposed on the touch screen layer. The proximity touch indicates that objects such as a user's finger or a pen are at a close distance from the cover member 10, like in hovering. The touch sensor driving unit 53 may transmit sensor data to the main processor according to the sensed voltages, and the main processor may analyze the sensor data to calculate touch coordinates in which touch input occurs.

A power supply unit for supplying driving voltages for driving sub-pixels, a scan driving unit, and the display driving unit 52 of the display panel 50 may be further arranged on the display circuit board 51. In one or more embodiments, the power supply unit may be integrated with the display driving unit 52, and in this case, the display driving unit 52 and the power supply unit may be formed of one integrated circuit.

In one or more embodiments, the display panel 50 may include a display area DA, and a peripheral area PA. Furthermore, the display panel 50 may include a substrate 100, a thin film transistor TFT, and a light emitting device, which are sequentially stacked. At this time, the display element may be an organic light emitting diode (OLED), but the present disclosure is not limited thereto.

The substrate 100 may include an insulating material such as glass, quartz, and/or polymer resin. The substrate 100 may be a rigid substrate or a flexible substrate that may be bent, folded, or rolled.

In one or more embodiments, the substrate 100 may include a polymer resin such as polyethersulfone, polyacrylate, polyether imide, polyethylene naphthalate, PET, polyphenylene sulfide, polyarylate, PI, polycarbonate or cellulose acetate propionate. The substrate 100 may have a multi-layered structure including a layer including the above-described polymer resin and an inorganic layer. For example, the substrate 100 may include two layers including the above-mentioned polymer resin and an inorganic barrier layer interposed therebetween.

A buffer layer 111 may be positioned on the substrate 100 to block or reduce the infiltration of foreign materials, moisture, or outside air from the lower portion of the substrate 100, and may provide a flat surface to the substrate 100. The buffer layer 111 may include an inorganic material such as an oxide or a nitride, or an organic material, or an organic/inorganic composite material and may have a multi-layered structure of the inorganic material and the organic material. A barrier layer for blocking infiltration of the outside air may be further included between the substrate 100 and the buffer layer 111. In one or more embodiments, the buffer layer 111 may include silicon oxide ($SiO_2$) or silicon nitride ($SiN_x$). The buffer layer 111 may be provided so that a first buffer layer 111a and a second buffer layer 111b are stacked on the substrate 100.

A pixel circuit PC including a thin film transistor TFT and a storage capacitor Cst may be disposed on the buffer layer 111. In one or more embodiments, the thin film transistor TFT may include a semiconductor layer A, a gate electrode G, a source electrode S, and a drain electrode D, and the storage capacitor Cst may include a lower electrode CE1 and an upper electrode CE2.

In one or more embodiments, the semiconductor layer A may be disposed on the buffer layer 111. In one or more embodiments, the semiconductor layer A may include polysilicon. Alternatively, in one or more embodiments, the semiconductor layer A may include amorphous silicon. In one or more embodiments, the semiconductor layer A may include an oxide of at least one material selected from the group consisting of indium (In), gallium (Ga), stannum (Sn), zirconium (Zr), vanadium (V), hafnium (Hf), cadmium (Cd), germanium (Ge), chromium (Cr), titanium (Ti), and zinc (Zn). The semiconductor layer A may include a channel region, and a source region and a drain region doped with impurities.

A first gate insulating layer 112 may be disposed on the semiconductor layer A. The first gate insulating layer 112 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), and/or zinc oxide ($ZnO_x$). The first gate insulating layer 112 may have a single layer or multi-layered structure including the inorganic insulating material described above. The zinc oxide ($ZnO_x$) may be zinc oxide (ZnO) and/or zinc peroxide ($ZnO_2$).

A gate electrode G may be disposed on the first gate insulating layer 112. In one or more embodiments, at least a part of the gate electrode G may overlap the semiconductor layer A disposed thereunder. In one or more embodiments, the gate electrode G may include molybdenum (Mo), aluminum (Al), copper (Cu), titanium (Ti), and/or the like and may have a single layer or multi-layered structure. For example, the gate electrode G may be a single layer of Mo.

A second gate insulating layer 113 may be disposed on the gate electrode G. The second gate insulating layer 113 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), and/or zinc oxide ($ZnO_x$). The second gate insulating layer 113 may have a single layer or multi-layered structure including the inorganic insulating material described above. The zinc oxide ($ZnO_x$) may be zinc oxide (ZnO) and/or zinc peroxide ($ZnO_2$).

An upper electrode CE2 of the storage capacitor Cst may be disposed on the second gate insulating layer 113. In one or more embodiments, at least a part of the upper electrode CE2 may overlap the gate electrode G disposed thereunder. In one or more embodiments, the gate electrode G and the upper electrode CE2 that overlap each other with the second gate insulating layer 113 therebetween may constitute the storage capacitor Cst. For example, the gate electrode G may be a lower electrode CE1 of the storage capacitor Cst.

The upper electrode CE2 may include aluminum (Al), platinum (Pt), palladium (Pd), silver (Ag), magnesium (Mg), gold (Au), nickel (Ni), neodymium (Nd), iridium (Ir), Chromium (Cr), calcium (Ca), molybdenum (Mo), titanium (Ti), tungsten (W), and/or copper (Cu) and may have a single layer or multi-layered structure of the above-described materials.

An interlayer insulating layer 115 may be disposed on the upper electrode CE2. The interlayer insulating layer 115 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), and zinc oxide ($ZnO_x$). The interlayer insulating layer 115 may have a single layer or multi-layered structure including the inorganic insulating material described above. The zinc oxide ($ZnO_x$) may be zinc oxide (ZnO) and/or zinc peroxide ($ZnO_2$).

A source electrode S and/or a drain electrode D may be disposed on the interlayer insulating layer 115. The source electrode S and/or the drain electrode D may include a conductive material including molybdenum (Mo), aluminum (Al), copper (Cu), titanium (Ti), and/or the like and may have a single layer or multi-layered structure including the above-described materials. In one or more embodiments, the source electrode S and the drain electrode D may have a multi-layered structure of Ti/Al/Ti.

A planarization layer 117 may be disposed on the source electrode S and/or the drain electrode D. The planarization layer 117 may have a flat upper surface so that the pixel electrode 121 disposed thereon may be formed flat.

The planarization layer 117 may include an organic material or an inorganic material, and may be provided in a single layer structure, or a multi-layered structure. The planarization layer 117 may include general-purpose polymer such as benzocyclobutene (BCB), PI, hexamethyldisiloxane (HMDSO), polymethylmethacrylate (PMMA), or polystyrene (PS), polymer derivatives having a phenol-based group, acrylic polymers, imide-based polymers, aryl ether-based polymers, amide-based polymers, fluorine-based polymers, P-xylene-based polymers, or vinyl alcohol-based polymers. The planarization layer 117 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), and zinc oxide ($ZnO_x$). When forming the planarization layer 117, in order to provide a flat top surface after a layer is formed, chemical mechanical polishing may be performed on the upper surface of the layer. The zinc oxide ($ZnO_x$) may be zinc oxide (ZnO) and/or zinc peroxide ($ZnO_2$).

The planarization layer 117 may have a via hole for exposing any one of the source electrodes S and/or the drain electrode D of the thin film transistor TFT, and the pixel electrode 121 may be in contact with the source electrode S and/or the drain electrode D through the via hole and may be connected (e.g., electrically connected) to the thin film transistor TFT.

In one or more embodiments, display elements including light emitting devices ED may be disposed on the planarization layer 117. In one or more embodiments, the light emitting devices ED may be organic light emitting diodes (OLEDs). In one or more embodiments, the organic light emitting diode (OLED) may include a pixel electrode 121, a light emitting layer 122*b*, and an opposite electrode 123.

The pixel electrode 121 may include a conductive oxide such as indium tin oxide (ITO), indium zinc oxide (IZO), zinc oxide (ZnO), indium oxide ($In_2O_3$), indium gallium oxide (IGO), and/or aluminum zinc oxide (AZO). The pixel electrode 121 may include a reflective layer including silver (Ag), magnesium (Mg), aluminum (Al), platinum (Pt), palladium (Pd), gold (Au), nickel (Ni), neodymium (Nd), iridium (Ir), chromium (Cr), or a compound thereof. For example, the pixel electrode 121 may have a structure having films including ITO, IZO, ZnO, or $IN_2O_3$ on/under the above-mentioned reflective film. In this case, the pixel electrode 121 may have a structure in which ITO/Ag/ITO is stacked.

The pixel defining layer 119 may cover the edge of the pixel electrode 121 and include an opening OP exposing at least a portion of the pixel electrode 121 on the planarization layer 117. The emission region of the organic light emitting diode (OLED), that is, the size and shape of a sub-pixel may be defined by the opening OP.

By increasing a distance between edges of the pixel electrode 121 and an opposite electrode 123 on the pixel electrode 121, the pixel defining layer 119 may prevent or substantially prevent an arc from occurring in the edges of the pixel electrode 121. The pixel defining layer 119 may include an organic insulating material such as a PI, polyamide, acrylic resin, benzocyclobutene, HMDSO, and phenol resin using a method such as spin coating.

A light emitting layer 122b formed to correspond to the pixel electrode 121 may be disposed in the opening OP of the pixel defining layer 119. The light emitting layer 122b may include a polymeric material or a small molecular material, and may emit red light, green light, blue light, or white light.

An organic functional layer 122e may be disposed on an upper and/or lower portion of the light emitting layer 122b. The organic functional layer 122e may include a first functional layer 122a and a second functional layer 122c. The first functional layer 122a or the second functional layer 122c may not be provided.

The first functional layer 122a may be disposed at a lower portion of the light emitting layer 122b. The first functional layer 122a may be a single layer or multilayer provided as an organic material. The first functional layer 122a may be a hole transport layer (HTL) having a single layer structure. In one or more embodiments, the first functional layer 122a may include a hole injection layer (HIL) and a hole transport layer (HTL). The first functional layer 122a may be integrally formed so as to correspond to the organic light emitting diodes (OLEDs) included in the display area DA.

The second functional layer 122c may be disposed at an upper portion of the light emitting layer 122b. The second functional layer 122c may have a single layer or multi-layered structure including an organic material. The second functional layer 122c may include an electron transport layer (ETL) and/or an electron injection layer (EIL). The second functional layer 122c may be integrally formed so as to correspond to the organic light emitting diodes (OLEDs) included in the display area DA.

The opposite electrode 123 may be disposed on the second functional layer 122c. The opposite electrode 123 may include a conductive material having a low working function. For example, the opposite electrode 123 may include a (semi-) transparent layer including silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), or a compound thereof. In one or more embodiments, the opposite electrode 123 may further include a layer such as ITO, IZO, ZnO, or $IN_2O_3$ on the (semi-)transparent layer including the above-described material. The opposite electrode 123 may be integrally formed so as to correspond to the organic light emitting diodes (OLEDs) included in the display area DA.

An upper layer 150 may be formed on the opposite electrode 123. In one or more embodiments, the upper layer 150 may be provided as an organic material or an inorganic material. The upper layer 150 may be a layer provided to protect the opposite electrode 123 and increase light extraction efficiency. The upper layer 150 may include an organic material having a higher refractive index than that of the opposite electrode 123. In one or more embodiments, the upper layer 150 may be provided so that layers having different refractive indexes are stacked. For example, the upper layer 150 may be provided in such a way that a high refractive index layer/a low refractive index layer/a high refractive index layer is provided. In this case, the refractive index of the high refractive index layer may be 1.7 or more, and the refractive index of the low refractive index layer may be 1.3 or less.

The upper layer 150 may further include lithium fluoride (LiF). In one or more embodiments, the upper layer 150 may include an inorganic insulating material such as silicon oxide ($SiO_2$) or silicon nitride ($SiN_x$). In one or more embodiments, this upper layer 150 may be omitted. However, for convenience of explanation, a case where the upper layer 150 is disposed on the opposite electrode 123, will be described in more detail.

In one or more embodiments, the display panel 50 may include an encapsulation member that shields the upper layer 150. In one or more embodiments, the encapsulation member may include an encapsulation substrate arranged to face the substrate 100, and a sealing member that is arranged between the substrate 100 and the encapsulation substrate and blocks a space between the substrate 100 and the encapsulation substrate.

In one or more embodiments, the encapsulation member may also include a thin film encapsulation layer. The thin film encapsulation layer may be disposed so as to contact directly on the upper layer 150. At this time, the thin film encapsulation layer may cover a portion of the display area DA and the peripheral area PA, and may prevent or substantially prevent external moisture and oxygen penetration. The thin film encapsulation layer may include at least one organic layer and at least one inorganic layer. Hereinafter, for convenience of explanation, a case where the thin film encapsulation layer includes a first inorganic layer, an organic layer and a second inorganic layer which are sequentially stacked on the upper surface of the upper layer 150, will be described in more detail.

The first inorganic layer may cover the opposite electrode 123 and may include silicon oxide, silicon nitride and/or silicon oxynitride, and/or the like. The first inorganic layer may be formed along the structure of the lower portion, and the upper surface of the first inorganic layer may not be flat. The organic layer may cover the first inorganic layer, which may cause the upper surface to be substantially flat unlike the first inorganic layer. For example, the organic layer may be provided with the upper surface in a portion corresponding to the display area DA. The organic layer may include one or more materials selected from the group consisting of PET, polyethylene naphthalate, polycarbonate, PI, polyethylene sulfonate, polyoxymethylene, polyarylate, and hexamethyldisiloxane. The second inorganic layer may cover the organic layer and may include silicon oxide, silicon nitride and/or silicon oxynitride, and/or the like.

The display panel 50 may include a touch screen layer. The touch screen layer may include a touch electrode, and may be a layer for sensing whether to touch the user. A touch screen layer may be disposed on the sealing member as described above.

Figure 12:
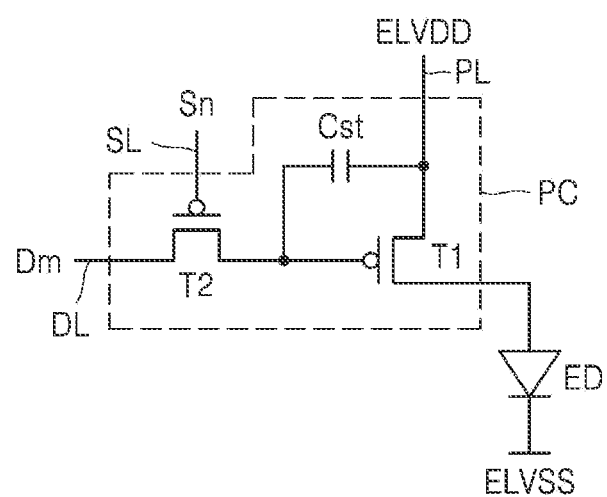
FIGS. 12 and 13 are equivalent circuits of a pixel circuit for driving a display device according to one or more embodiments.
Figure 13:
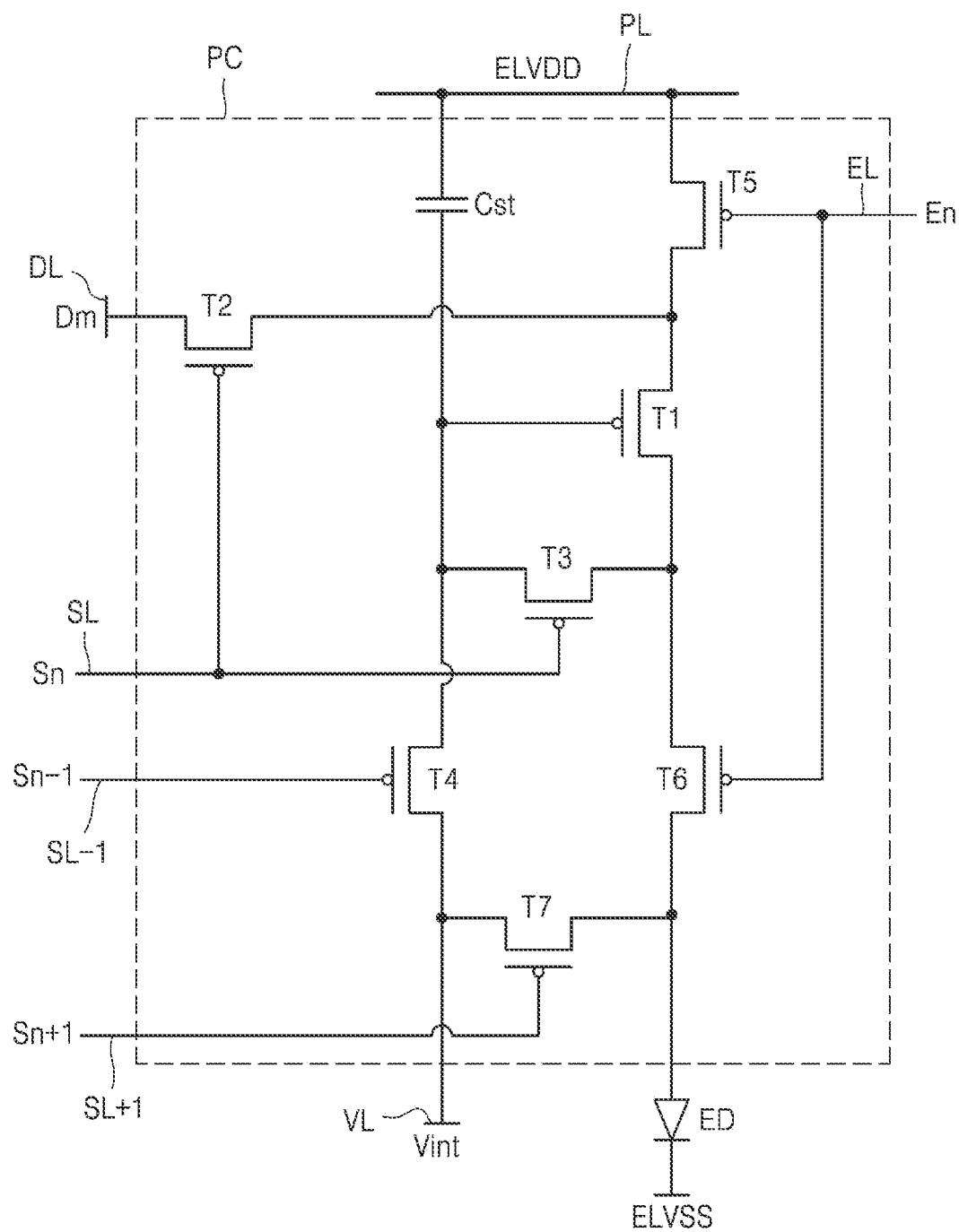

FIGS. 12 and 13 are equivalent circuits of a pixel circuit for driving a display device according to one or more embodiments.

Referring to FIGS. 12 and 13, the pixel circuit PC may be connected to the light emitting device ED to implement emission of sub-pixels. In one or more embodiments, the pixel circuit PC may include a driving thin film transistor T1, a switching thin film transistor T2, and a storage capacitor Cst. The switching thin film transistor T2 may be connected to the scan line SL and the data line DL, and may transfer a data signal Dm input to the data line DL according to the scan signal Sn input to a scan line SL to the driving thin film transistor T1.

The storage capacitor Cst may be connected to the switching thin film transistor T2 and a driving voltage line PL, and may store a voltage corresponding to a difference between a voltage transmitted from the switching thin film transistor T2 and a driving voltage ELVDD supplied to the driving voltage line PL.

The driving thin film transistor T1 may be connected to the driving voltage line PL and the storage capacitor Cst, and may control a driving current flowing through the light emitting device ED from the driving voltage line PL corresponding to the voltage value stored in the storage capacitor Cst. The light emitting device ED may emit light having a set or predetermined brightness by the driving current.

In FIG. 12, a case where a pixel circuit PC includes two thin film transistors and one storage capacitor has been described, but the present disclosure is not limited thereto.

Referring to FIG. 13, the pixel circuit PC may include a driving thin film transistor T1, a switching thin film transistor T2, a compensated thin film transistor T3, a first initialization thin film transistor T4, an operation control thin film transistor T5, an emission control thin film transistor T6, and a second initialization thin film transistor T7.

In FIG. 13, each pixel circuit PC includes signal lines SL, SL−1, SL+1, EL, and DL, an initialization voltage line VL and a driving voltage line PL. However, the present disclosure is not limited thereto. In one or more embodiments, at least one of the signal lines SL, SL−1, SL+1, EL, and DL, or/and the initialization voltage line VL may be shared in neighboring pixel circuits.

The drain electrode of the driving thin film transistor T1 may be connected (e.g., electrically connected) to the light emitting device ED via the emission control thin film transistor T6. The driving thin film transistor T1 may receive the data signal Dm according to the switching operation of the switching thin film transistor T2 and may supply the driving current to the light emitting device ED.

The gate electrode of the switching thin film transistor T2 may be connected to the scan line SL, and the source electrode may be connected to the data line DL. The drain electrode of the switching thin film transistor T2 may be connected to the source electrode of the driving thin film transistor T1 and may be connected to the driving voltage line PL via the operation control thin film transistor T5.

The switching thin film transistor T2 may be turned on according to the scan signal Sn transmitted through the scan line SL and may perform a switching operation of transmitting the data signal Dm transmitted via the data line DL to the source electrode of the driving thin film transistor T1.

A gate electrode of the compensation thin film transistor T3 may be connected to the scan line SL. A source electrode of the compensation thin film transistor T3 may be connected to the drain electrode of the driving thin film transistor T1 and may be connected to a pixel electrode of the light emitting device ED via the emission control thin film transistor T6. The drain electrode of the compensation thin film transistor T3 may be connected to any one of electrodes of the storage capacitor Cst, the source electrode of the first initialization thin film transistor T4, and the gate electrode of the driving thin film transistor T1. The compensation thin film transistor T3 may be turned on according to the scan signal Sn transmitted through the scan line SL, may connect the gate electrode and the drain electrode of the driving thin film transistor T1 to diode-connect the driving thin film transistor T1.

The gate electrode of the first initialization thin film transistor T4 may be connected to a previous scan line SL−1. The drain electrode of the first initialization thin film transistor T4 may be connected to an initialization voltage line VL. The source electrode of the first initialization thin film transistor T4 may be connected to any one of electrodes of the storage capacitor Cst, the drain electrode of the compensation thin film transistor T3, and the gate electrode of the driving thin film transistor T1. The first initialization thin film transistor T4 may be turned on according to the previous scan signal Sn−1 transmitted through the previous scan line SL−1 and may transmit the initialization voltage Vint to the gate electrode of the driving thin film transistor T1 to perform an initialization operation for initializing the voltage of the gate electrode of the driving thin film transistor T1.

A gate electrode of the operation control thin film transistor T5 may be connected to the emission control line EL. A source electrode of the operation control thin film transistor T5 may be connected to the driving voltage line PL. The drain electrode of the operation control thin film transistor T5 may be connected to the source electrode of the driving thin film transistor T1 and the drain electrode of the switching thin film transistor T2.

A gate electrode of the emission control thin film transistor T6 may be connected to the emission control line EL. The source electrode of the emission control thin film transistor T6 may be connected to the drain electrode of the driving thin film transistor T1 and the source electrode and the compensating thin film transistor T3. The drain electrode of the emission control thin film transistor T6 may be connected (e.g., electrically connected) to the pixel electrode of the light emitting device ED. The operation control thin film transistor T5 and the emission control thin film transistor T6 may be turned on according to the emission control signal En transmitted through the emission control line EL, and the driving voltage ELVDD may be transmitted to the light emitting device ED so that a driving current may flow through the light emitting device ED.

The gate electrode of the second initialization thin film transistor T7 may be connected to a subsequent scan line SL+1. The source electrode of the second initialization thin film transistor T7 may be connected (e.g., electrically connected) to the pixel electrode of the light emitting device ED. The drain electrode of the second initialization thin film transistor T7 may be connected to the initialization voltage line VL. The second initialization thin film transistor T7 may be turned on according the subsequent scan signal Sn+1 transmitted through the subsequent scan line SL+1 to initialize the pixel electrode of the light emitting device ED.

In FIG. 13, the first initialization thin film transistor T4 and the second initialization thin film transistor T7 are connected to the previous scan line SL−1 and the subsequent scan line SL+1, respectively. However, the present disclosure is not limited thereto. In one or more embodiments, the first initialization thin film transistor T4 and the second initialization thin film transistor T7 may be connected to the previous scan line SL−1 and may be driven according to the previous scan signal Sn−1.

Another electrode of the storage capacitor Cst may be connected to the driving voltage line PL. One electrode of the storage capacitor Cst may be connected to the gate electrode of the driving thin film transistor T1, the drain electrode of the compensation thin film transistor T3, and the source electrode of the first initialization thin film transistor T4.

The opposite electrode (e.g., a cathode) of the light emitting device ED may receive a common voltage ELVSS. The light emitting device ED may receive the driving current from the driving thin film transistor T1 and may emit light.

The pixel circuit PC is not limited to the number and circuit design of the thin film transistors and storage capacitors described with reference to FIGS. 12 and 13, and the number of circuit elements (e.g., thin film transistors and capacitors) and circuit design may be variously changed in any suitable manner.

In the display device according to embodiments of the present disclosure, defects may not occur, and a cover member may not be lifted. Furthermore, in the display device according to the embodiments of the present disclosure, the end of the bending protective layer and the end of the optical functional layer are in contact with each other so that malfunction of the display panel may be prevented or substantially prevented due to static electricity introduced into a gap in which the end of the bending protective layer is spaced from the end of the optical functional layer.

In the method of manufacturing the display device according to embodiments of the present disclosure, the end of the bending protective layer and the end of the optical functional layer may be in contact with each other through a structure (e.g., a simple structure).

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the drawings, it will be understood by those of ordinary skill in the art that various suitable changes in form and details may be made therein without departing from the spirit and scope as defined by the following claims and equivalents thereof.

What is claimed is:

1. A display device comprising:
    a display panel comprising a substrate having a bent portion and a bending protective layer arranged on the bent portion of the substrate; and
    an optical functional layer on the display panel and in contact with the bending protective layer, the optical functional layer having an accommodating portion configured to accommodate deformation of the optical functional layer.

2. The display device of claim 1, further comprising a cover member arranged on the optical functional layer.

3. The display device of claim 2, wherein the cover member comprises an opaque layer configured to block transmission of light.

4. The display device of claim 3, wherein the accommodating portion overlaps the opaque layer in a plan view.

5. The display device of claim 2, further comprising a first adhesive member arranged between the cover member and the optical functional layer.

6. The display device of claim 5, wherein the first adhesive member shields the accommodating portion.

7. The display device of claim 5, wherein the first adhesive member is configured to expose the accommodating portion to an outside.

8. The display device of claim 5, wherein the accommodating portion is in the optical functional layer and the first adhesive member.

9. The display device of claim 1, wherein the accommodating portion is a groove or hole arranged in the optical functional layer.

10. The display device of claim 9, wherein at least a portion of an inner surface of the accommodating portion is inclined.

11. The display device of claim 9, wherein at least a portion of an inner surface of the accommodating portion is curved.

12. The display device of claim 9, wherein an inner surface of the accommodating portion is stepped.

13. The display device of claim 1, further comprising at least one of a protective film, a panel protective member, a plate, a digitizer, or a cushion layer arranged on a surface of the display panel.

14. The display device of claim 1, wherein the accommodating portion has a linear shape in a cross-sectional view.

15. A method of manufacturing a display device, the method comprising:
    attaching a first upper cover film to a first surface of an optical functional layer;
    attaching a lower cover film to a second surface of the optical functional layer;
    removing a part of the first upper cover film;
    removing a part of the optical functional layer; and
    attaching a second upper cover film to the first surface of the optical functional layer.

16. The method of claim 15, wherein the lower cover film comprises a first lower cover film and a second lower cover film, and
    wherein the method further comprises removing the second lower cover film of the lower cover film.

17. The method of claim 16, further comprising removing the first lower cover film and attaching the optical functional layer to a display panel.

18. The method of claim 17, further comprising forming a bending protective layer in a bending area of the display panel to be in contact with an end of the optical functional layer.

19. The method of claim 16, wherein the second lower cover film, the optical functional layer, and the second upper cover film are stacked together, and
    wherein the method further comprises cutting the second lower cover film, the optical functional layer, and the second upper cover film to a certain length.

20. The method of claim 19, further comprising arranging the optical functional layer from which the second lower cover film is removed, on a display panel.

21. The method of claim 20, wherein an end of the second upper cover film is farther from an end of the display panel than an end of the optical functional layer is to the end of the display panel.

22. The method of claim 15, wherein the part of the first upper cover film and the part of the optical functional layer are concurrently removed.

23. A method of manufacturing a display device, the method comprising:
    arranging an optical functional layer on a display panel;
    removing a part of the optical functional layer; and
    forming a bending protective layer in a bending area of the display panel to be in contact with an end of the optical functional layer.

24. The method of claim 23, further comprising removing a part of an upper cover film arranged on the optical functional layer.

25. The method of claim 24, further comprising entirely removing the upper cover film on the optical functional layer.

\* \* \* \* \*